US012795109B2

(12) United States Patent
Chen

(10) Patent No.: US 12,795,109 B2
(45) Date of Patent: Nov. 10, 2026

(54) TEMPORAL CONSISTENCY AND COMPRESSION EFFICIENCY IN VIDEO STREAMING

(71) Applicant: Adeia Guides Inc., San Jose, CA (US)

(72) Inventor: Tao Chen, Palo Alto, CA (US)

(73) Assignee: Adeia Guides Inc., San Jose, CA (US)

( * ) Notice: Subject to any disclaimer, the term of this patent is extended or adjusted under 35 U.S.C. 154(b) by 0 days.

(21) Appl. No.: 19/251,383

(22) Filed: Jun. 26, 2025

(65) Prior Publication Data

US 2026/0006215 A1 Jan. 1, 2026

Related U.S. Application Data

(60) Provisional application No. 63/665,183, filed on Jun. 27, 2024.

(51) Int. Cl.
*H04N 19/14* (2014.01)
*H04N 19/105* (2014.01)
*H04N 19/172* (2014.01)
*H04N 19/186* (2014.01)

(52) U.S. Cl.
CPC ........... *H04N 19/14* (2014.11); *H04N 19/105* (2014.11); *H04N 19/172* (2014.11); *H04N 19/186* (2014.11)

(58) Field of Classification Search
CPC ............................. H04N 19/14; H04N 19/105
USPC .................................................... 375/240.02
See application file for complete search history.

(56) References Cited

U.S. PATENT DOCUMENTS

2024/0257903 A1 * 8/2024 Zhao ..................... G16B 15/30

OTHER PUBLICATIONS

"Enhancing your video in Zoom," Zoom Support, retrieved from https://support.zoom.com/hc/en/article?id=zm_kb&sysparm_article=KB0060352, Jun. 18, 2025, 10 pages.

(Continued)

*Primary Examiner* — Amir Shahnami
(74) *Attorney, Agent, or Firm* — HG Law LLP

(57) ABSTRACT

Systems and method for improving video streaming efficiency are provided. An example method includes receiving encoded frames of a media content item comprising a sequence of encoded grayscale frames and an encoded reference frame, wherein each encoded grayscale frame comprises a luminance parameter normalized to a luminance parameter of the encoded reference frame. The method also includes receiving metadata comprising color transfer instructions, and decoding the received frames to obtain a sequence of decoded grayscale frames and a decoded reference frame. The method then includes determining, for each decoded grayscale frame, a color transfer based on: (i) the color transfer instructions, and (ii) the decoded reference frame, and applying the color transfer to each decoded frame to obtain a sequence of decoded color frames.

20 Claims, 9 Drawing Sheets

(56) References Cited

OTHER PUBLICATIONS

Liu, S., "An Overview of Color Transfer and Style Transfer for Images and Videos," Computer Vision and Pattern Recognition (cs.CV); Graphics (cs.GR), arXiv:2204.13339, Apr. 2022, 12 pages.

Reinhold, J., et al., "Evaluating the Impact of Intensity Normalization on MR Image Synthesis," Proc SPIE Int Soc Opt Eng. vol. 10949, Mar. 2019, 14 pages.

Xia, M., et al., "Invertible grayscale," ACM Transactions on Graphics (TOG), vol. 37, Issue 6 Article No. 246, Dec. 2018, 10 pages.

Xu, M., et al., "Color Transfer Algorithm between Images Based on a Two-Stage Convolutional Neural Network," Sensors, , vol. 22, No. 20, Oct. 13, 2022, 21 pages.

* cited by examiner

TEMPORAL CONSISTENCY AND COMPRESSION EFFICIENCY IN VIDEO STREAMING

BACKGROUND

The present disclosure relates to methods and systems for improving video streaming efficiency. Particularly, but not exclusively, the present disclosure relates to dynamically adjusting visual attributes, such as brightness and color, during streaming to maintain visual consistency and increase streaming efficiency.

SUMMARY

In the context of video streaming, e.g., using a web cam, consistent visual presentation remains an important challenge. As technology enables more dynamic and interactive content, the variance in video characteristics such as brightness, contrast, and saturation become more pronounced. Visual changes on a screen, such as opening a brightly colored application or transitioning between different content backgrounds, can significantly affect the brightness and color of the screen. As a result, video or image data captured by a recording device, such as a webcam, may be affected when capturing a subject viewing the screen. For example, when these abrupt changes occur, they alter how both the subject and the background appear in the captured video.

For instance, sudden shifts in screen brightness during a video stream can cause overexposure or underexposure in the video feed, which impacts the clarity and color accuracy of the video output. Similarly, fluctuations in background color schemes can lead to inaccurate color representation. These variations affect how colors are perceived and recorded, often resulting in a video that looks unnatural or distorted. These variations may be notably present when, for example, a user in a video conference setting changes their position, or changes the window or application shown on their screen.

Furthermore, color variation and inconsistency requires additional corrections during post-processing, increasing computational workload and decreasing streaming efficiency. The inconsistency in visual characteristics not only disrupts the viewer's experience but also challenges video compression algorithms leading to inefficiencies in data compression, necessitating higher bandwidth and more processing to maintain desired video characteristics.

Current approaches, typically designed for use in static or controlled environments where lighting and scene dynamics are carefully managed, struggle to maintain visual consistency in more dynamic settings. This can lead to a degradation of viewer experience due to frequent fluctuations in video characteristics, abrupt changes in image clarity, and noticeable changes in video color and brightness. Furthermore, to compensate for these fluctuations and attempt to stabilize visual quality, some systems require increased computational resources, necessitating higher bitrates. This increased demand for higher bitrates strains computing resources and burdens network capacities, which is particularly challenging during live streaming or high-definition broadcasts.

Moreover, existing methodologies in video processing generally address these fluctuations by applying rigid, predefined adjustments that lack the flexibility to adapt to real-time changes in the video stream. These methods often result in either over-compensation or under-compensation for changes in visual attributes, which can distort the true color and intensity of the video, leading to a less authentic viewer experience. The technical limitations of such methods also extend to the increased processing power required, which can limit the scalability of video streaming solutions across different platforms and devices.

It is therefore an objective of the present disclosure to provide methods and systems that improve the visual consistency of video streams and do so in a manner that is more computationally efficient and adaptable to various streaming scenarios.

To address the problems noted above, several example methods are described herein. In a first example, a method includes a receiving device receiving, using control circuitry, encoded frames of a media content item, the encoded frames comprising a sequence of encoded grayscale frames and an encoded reference frame associated with the sequence of encoded grayscale frames, wherein each encoded grayscale frame in the sequence of encoded grayscale frames comprises a luminance parameter normalized to a luminance parameter of the encoded reference frame. The receiving device also receives metadata for the sequence of encoded grayscale frames, the metadata comprising color transfer instructions for the sequence of encoded grayscale frames. The receiving device then decodes the sequence of encoded grayscale frames and the encoded reference frame to obtain a sequence of decoded grayscale frames and a decoded reference frame. The receiving device then determines for each decoded grayscale frame of the sequence of decoded grayscale frames, a color transfer based on: (i) the color transfer instructions, and (ii) the decoded reference frame, and applies the color transfer to each decoded frame of the sequence of decoded grayscale frames, to obtain a sequence of decoded color frames.

In some examples, the method further includes detecting a change in a luminance parameter between successive frames of the media content item. Based on the detected change, the method includes associating a color reference frame with a sequence of color frames, wherein the color reference frame comprises a selected luminance parameter. The method then includes de-colorizing the color reference frame and the sequence of color frames to produce a grayscale reference frame and a sequence of grayscale frames, and normalizing a luminance parameter of each grayscale frame in the sequence of grayscale frames to the selected luminance parameter.

In some examples, the method further includes encoding the color reference frame and the sequence of grayscale frames and transmitting the encoded frames with the color transfer instructions.

In some examples, de-colorizing the color reference frame is performed in an invertible manner. That is, the process used to convert the color reference frame into a grayscale reference frame may be reversable.

In some examples, the encoded reference frame is an encoded color reference frame. The method may further include decoding, by the receiving device, the encoded color reference frame to obtain a decoded color reference frame. The color transfer instructions may then comprise a first instruction to apply the color transfer of the decoded color reference frame to each frame of the sequence of decoded grayscale frames to obtain the sequence of decoded color frames.

In some examples, the method further comprises storing the sequence of encoded grayscale frames in a first buffer, and based on the first instruction of the color transfer instructions, (i) decoding the sequence of encoded grayscale frames stored in the first buffer, ad (ii) applying the color transfer of the decoded color reference frame to each frame of the sequence of decoded grayscale frames stored in the first buffer to obtain the sequence of decoded color frames. The method may then include storing the sequence of decoded color frames in a second buffer.

In some examples, the encoded reference frame is an encoded grayscale reference frame that has been grayscale encoded and that has been generated by way of a de-colorization of a color frame to obtain the encoded grayscale reference frame. The method may further include decoding the encoded grayscale reference frame to obtain a decoded grayscale reference frame, and inverting or reversing the de-colorization of the grayscale reference frame to obtain a decoded color reference frame.

In some examples, the method further includes storing the sequence of encoded grayscale frames and the encoded grayscale reference frame in a first buffer, and based on the color transfer instructions: (i) decoding the encoded grayscale reference frame and decoding the sequence of encoded grayscale frames stored in the first buffer, and (ii) applying the color transfer of the decoded color reference frame to each frame of the sequence of decoded grayscale frames stored in the first buffer to obtain the sequence of decoded color frames. The method then includes storing the sequence of decoded color frames in a second buffer.

In some examples, applying the color transfer of the decoded reference frame to the sequence of decoded grayscale frames further comprises applying chrominance parameters associated with the decoded reference frame to each frame of the sequence of decoded grayscale frames to obtain the sequence of decoded color frames.

In some examples, the encoded reference frame is received at a higher bitrate than the sequence of encoded grayscale frames.

In a second example, a method includes receiving encoded frames of a media content item, the encoded frames comprising a sequence of encoded grayscale frames. The method also includes causing the sequence of encoded grayscale frames to be stored in a buffer, and receiving metadata comprising color transfer instructions for controlling a color transfer to the sequence of grayscale reference frames. The method further includes obtaining an encoded color reference frame associated with the sequence of encoded grayscale frames, decoding the encoded color reference frame to obtain a decoded color reference frame, and decoding the sequence of encoded grayscale frames, wherein decoding the sequence of encoded grayscale frames comprises applying a color transfer to each frame of the sequence of encoded grayscale frames based on the color transfer instructions and the decoded color reference frame.

In some examples, obtaining the encoded color reference frame associated with the sequence of encoded grayscale frames comprises obtaining the encoded color reference frame from the received encoded frames of the media content item. In other examples, obtaining the encoded color reference frame associated with the sequence of encoded grayscale frames comprises obtaining the encoded color reference frame from a buffer.

In some examples, the method further includes selecting a first encoded grayscale frame of the sequence of encoded grayscale frames and decoding the first encoded grayscale frame of the sequence of encoded grayscale frames to obtain a first decoded grayscale frame. The method then includes applying a color transfer to the first decoded grayscale frame to obtain a first decoded color frame, and setting the first decoded color frame as the decoded color reference frame to be used in decoding subsequent encoded grayscale frames of the sequence of encoded grayscale frames.

In some examples, obtaining the encoded color reference frame comprises obtaining an encoded grayscale reference frame from the received encoded frames, decoding the encoded grayscale reference frame to obtain a decoded grayscale reference frame, and inverting a color transfer of the decoded grayscale reference frame based on the color transfer instructions to obtain the decoded color reference frame.

In some examples, inverting the color transfer of the decoded grayscale reference frame to obtain the decoded color reference frame comprises restoring chrominance values of each pixel of the of the decoded grayscale reference frame based on the color transfer instructions.

In some examples, decoding the sequence of encoded grayscale frames further comprises obtaining a sequence of decoded color frames. The method further includes using one or more frames of the sequence of decoded color frames as a reference frame for inter-prediction during decoding of subsequently received frames of the media content item, wherein the inter-prediction comprises: receiving a subsequent sequence of encoded frames of the media content item, the subsequent sequence of encoded frames comprising a subsequent sequence of encoded grayscale frame, and applying a color transfer of the sequence of decoded color frames to the subsequent sequence of encoded grayscale frames to obtain a subsequent sequence of decoded color frames.

In some examples, decoding the sequence of encoded grayscale frames comprises obtaining a sequence of decoded grayscale frames. The method then includes determining a chrominance component value for each pixel of the decoded color reference frame, and applying the chrominance component values to each pixel of each frame of the sequence of decoded grayscale frames to obtain a sequence of decoded color frames.

In some examples, the received encoded frames of the media content item comprise a plurality of encoded reference frames each associated with a separate sequence of encoded grayscale frames.

In some examples, the method further includes utilizing a machine learning algorithm to refine applying the color transfer to each frame of the sequence of encoded grayscale frames, wherein the machine learning algorithm is trained on a dataset of reference grayscale frames and corresponding color frames.

In a third example, a method includes receiving, using control circuitry, encoded frames of a media content item, the encoded frames comprising an encoded reference frame and a sequence of encoded grayscale frames. The method also includes receiving metadata comprising color transfer instructions for controlling a color transfer to the sequence of encoded grayscale frames. The method then include decoding the sequence of encoded grayscale frames to obtain a sequence of decoded grayscale frames, and causing the sequence of decoded grayscale frames to be stored in a grayscale buffer. Then, in accordance with the color transfer instructions, the method includes: obtaining the sequence of decoded grayscale frames from the grayscale buffer, applying a color transfer to the sequence of decoded grayscale frames to obtain a sequence of decoded color frames, and causing the sequence of decoded color frames to be stored in a color buffer.

In some examples, the encoded reference frame is associated with the sequence of encoded grayscale frames, and the encoded reference frame is an encoded color reference frame. The method may then further include decoding the encoded color reference frame to obtain a decoded color reference frame, wherein the color transfer instructions comprise instructions to: cause the decoded color reference frame to be stored in the color buffer, and apply a color transfer of the decoded color reference frame to each frame of the sequence of decoded grayscale frames to obtain the sequence of decoded color frames.

In some examples, the encoded reference frame is associated with the sequence of encoded grayscale frames, and the encoded reference frame is an encoded grayscale reference frame. The method may then further include decoding the encoded grayscale reference frame to obtain a decoded grayscale reference frame, wherein the color transfer instructions comprise instructions to invert the color transfer of the decoded grayscale reference frame to obtain a decoded color reference frame. The method may then further include causing the decoded color reference frame to be stored in the color buffer, and applying a color transfer of the decoded color reference frame to each frame of the sequence of decoded grayscale frames.

In some examples, inverting the color transfer of the decoded grayscale reference frame to obtain the decoded color reference frame comprises restoring chrominance values of each pixel of the of the decoded grayscale reference frame based on the color transfer instructions.

In some examples, the method further includes using the sequence of decoded color frames as reference frames for inter-prediction during decoding of subsequently received frames of the media content item. The inter-prediction comprises receiving a subsequent sequence of encoded frames of the media content item, the subsequent sequence of encoded frames comprising a subsequent sequence of encoded grayscale frames, applying a color transfer of the sequence of decoded color frames stored in the color buffer to the subsequent sequence of encoded grayscale frames to obtain a subsequent sequence of decoded color frames, and storing the subsequent sequence of decoded color frames in the color buffer.

In some examples, the encoded reference frame is associated with the sequence of encoded grayscale frames, and the color transfer instructions comprise chrominance component values. The method may further include decoding the encoded reference frame to obtain a decoded reference frame, determining a chrominance component value for each pixel of the sequence of decoded grayscale frames based on a corresponding pixel of the decoded reference frame, and applying the chrominance component values to each pixel of each frame of the sequence of decoded grayscale frames to obtain the sequence of decoded color frames.

In some examples, each encoded grayscale frame in the sequence of encoded grayscale frames comprises a normalized visual parameter.

In some examples, the received encoded frames of the media content item comprise a plurality of encoded reference frames each associated with a separate sequence of encoded grayscale frames.

In some examples, the method further includes receiving instructions to output for display a first frame from the sequence of decoded color frames, and transferring the first frame from the color buffer to a display device for rendering.

In some examples, the method further includes utilizing a machine learning algorithm to refine applying the color transfer to the sequence of decoded grayscale frames to obtain the sequence of decoded color frames, wherein the machine learning algorithm is trained on a dataset of reference grayscale frames and corresponding color frames.

In a fourth example, a method includes receiving, using control circuity, encoded frames of a media content item, and receiving, using control circuitry, metadata comprising color transfer instructions for controlling a color transfer of a grayscale reference frame in the encoded frames. The method also includes decoding, using control circuitry, the grayscale reference frame, colorizing the grayscale reference frame based on received metadata to obtain a color reference frame, and causing the color reference frame to be stored in a buffer. The method further includes decoding a sequence of encoded frames in the encoded frames based on: (i) color transfer instructions for one or more grayscale target frames of the encoded frames and (ii) the color reference frame stored in the buffer.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
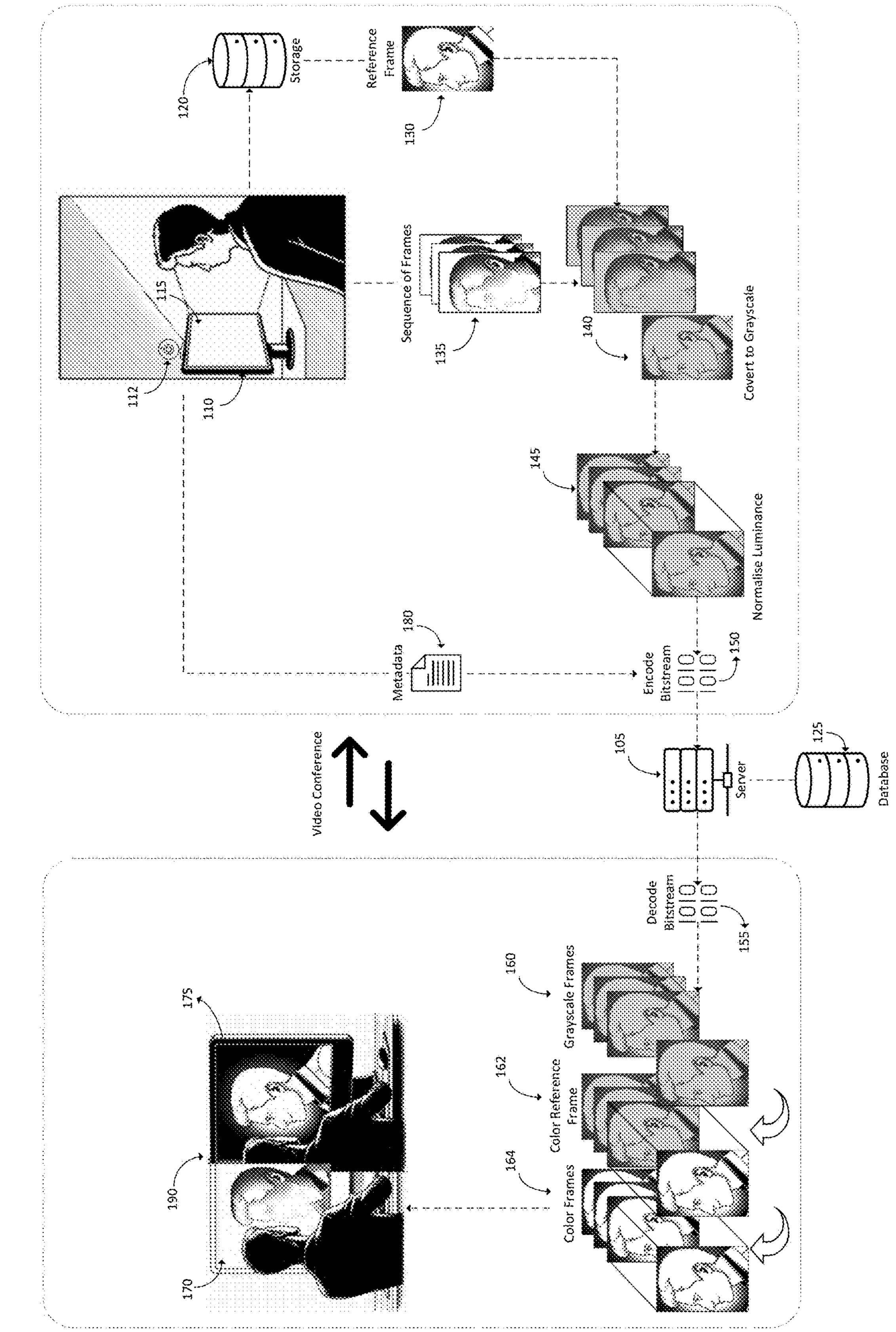
FIG. 1 illustrates an overview of a system for improving temporal consistency and compression efficiency in video streaming, in accordance with some examples of the disclosure.

FIG. 1 illustrates an overview of a system 100 configured to execute a video application for improving temporal consistency and compression efficiency in video streaming. In particular, the example shown in FIG. 1 illustrates a first user device 110 and a storage of the first user device 120, communicatively linked to a second user device 190 via a server 105 associated with a server database 125. The components illustrated in FIG. 1 may be communicatively linked by various means, including a wired connection, wireless network, or a combination of both. Additionally, the first and second user devices may also communicate directly with each other, bypassing the server.

Within the context of this disclosure, the terms "video frames" and "images" are used interchangeably merely for conciseness. For example, any disclosure relating to one of a video frame and an image applies equally to the other of a video frame and an image, despite an image not necessarily forming a frame of a video. The described methods and systems are broadly applicable to any sequence of visual data, including but not limited to video streams, still image sequences, animations, and any other visual media where consistent visual appearance and efficient data transmission are important.

Examples of this disclosure may operate within the context of a user at a display screen participating in a video call or conference. As such, the lighting conditions surrounding the capture of the user's face may be highly variable based on the lighting conditions of the room, and in particular based on the brightness, color, etc. of the display in front of the user. In some examples, variations in the brightness and color of the display screen due to changes in displayed content may cause disruptions or abrupt changes to the visual appearance of the user in the captured video feed. These disruptions may lead to overexposure or underexposure in the captured video, resulting in poor visual quality, and/or the need for a higher bitrate for transmission of video frames. In some examples, variations in the visual appearance of a video capture are caused by various factors such as ambient lighting changes (e.g., dimming in overall brightness of the room caused by a cloud passing in front of the sun), switching between applications or pages within an application having different color schemes (e.g., switching from a bright Word document to a dark PowerPoint slide, or between successive slides of a PowerPoint presentation), or adjustments in the display settings of the camera and/or display.

In the example shown in FIG. 1, user device 110 is illustrated as a display that is communicatively coupled to a camera 112. However, it should be appreciated that user device 110 may be a computer, smartphone, or any other computing device capable of capturing video or being communicatively coupled to a device configured to capture video, such as a tablet or a webcam-equipped smart TV. In the illustrated example, user device 110 is depicted with a screen that is brightly lit 115. This brightness causes the video feed of a user to become overexposed, which may lead to undesirable visual effects such as washed-out colors and loss of detail in the video.

In some examples, a reference frame 130 is captured and stored in a storage 120 e.g., by user device 110. The reference frame 130 may be used as a benchmark for normalizing visual parameters of other frames, such as luminance and color. For instance, frames that are identified as being visually inconsistent with desired parameters, e.g., due to overexposure or underexposure, may be adjusted so that their luminance is normalized to match the reference frame. Additionally, frames that are visually inconsistent with respect to color, such as when the screen 115 switches from a primarily blue display to a primarily red display, may be normalized as well.

In the context of this disclosure, the brightness and color components of video frames are referred to as luminance and chrominance, respectively. Luminance is the component of a video signal which carries information on brightness, representing the intensity or brightness of a video frame. Chrominance is the component of a video signal which carries information on color information in the video frame, including the hue and saturation of the frame. Hue represents the type of color (such as red, green, or blue), while saturation indicates the intensity or purity of the color. Together, luminance and chrominance define the visual characteristics or parameters of video frames, e.g., transmitted in a video signal.

In some examples, the reference frame 130 may be captured and stored after detecting a change in a visual parameter between successive frames of video capture. For instance, a significant change in luminance or a distinct change in the scene, such as a shift in what is being captured in the video feed, may trigger the capture of a new reference frame. In some cases, the reference frame is captured when the detected change exceeds a certain threshold, such as when the magnitude and location of chrominance parameters have significantly changed from one frame to another. In other examples, reference frames 130 may be captured at a regular interval (e.g., every 25 or 50 frames) and/or may be based on a frame rate of the camera 112.

In some examples, a reference frame is captured from a monitored sequence of frames which maintain periods of low variation in luminance and/or chrominance. During such periods, the system e.g., of user device 110, captures a reference frame that likely represents ideal visual parameters. For example, if the system detects a relatively consistent series of frames with little change over a period of time (e.g., less than a threshold change in luminance and/or chrominance), the system may identify one of these frames as the reference frame. In some examples, a reference frame may be identified by user selection. For instance, a user selection may indicate a frame which is visually ideal. The selected frame may be stored (e.g., in storage 120 or 125) and used as a reference for visual parameters of other frames in the sequence, as described in further detail below. In some examples, algorithms e.g., computer vision algorithms, may be used to analyze visual attributes such as histogram equalization, edge detection, and color distribution to identify frames that exhibit an optimal quality and may thus be suitable for use as reference frames.

In some examples, a sequence of frames 135 associated with the video feed from user device 110 and/or camera 112 is captured and converted to grayscale 140. In some examples, conversion to grayscale involves removing chrominance information from each frame, reducing the amount of information that needs to be retained to represent the frame. Reducing data complexity by removing the chrominance information decreases the amount of information that needs to be processed for transmission, thereby enhancing compression efficiency and reducing the required bandwidth for video streaming.

In some examples, reference frames are stored locally on the device capturing the video, e.g., in storage 120. Alternatively or additionally, reference frames may be transmitted to a server 105 and stored (in database 125) with metadata describing their luminance and chrominance parameters.

In some examples, the luminance of the sequence of frames 135 is normalized 145 to match the luminance of the reference frame 130. This may include using the luminance data of the reference frame 130 to adjust the luminance data of the sequence of grayscale frames 140. After normalization of the luminance data, the sequence of frames and the reference frame are encoded 150. The encoding process may compress the video data, making it more efficient for transmission over a network. In the example depicted in FIG. 1, the sequence of frames is encoded in grayscale, while the reference frame can be encoded either including the chrominance data (e.g., color) or without the chrominance data (e.g., grayscale).

Metadata 180, which may comprise color transfer instructions and/or chrominance data for one or more frames, such as the reference frame 130, may also be generated and transmitted along with the encoded video stream. The metadata provides information on how to reconstruct the color information for the normalized sequence of frames 145 during the decoding process. In some examples, the encoded bitstream 150, along with the metadata 180, is sent to the server 105. The server 105, which may be part of a video streaming or video conferencing service and associated with a database 125, may facilitate communication and streaming of the video content between devices. The server 105 may process the incoming video stream and direct it to the intended recipient, which in this example is the second user device 190. In other examples, there may be multiple second user devices (e.g., each user participating in the video conference may have a corresponding user device).

In some examples, before the bitstream 150 is displayed on the second user device, it is first decoded into a decoded bitstream 155. The decoding process reconstructs the video frames from the compressed bitstream provided by the server 105. Initially, the decoded frames are in grayscale 160. Circuitry of the second user device 190 e.g., of a decoding device, decodes the stream and prepares it for display. After the bitstream 155 is decoded into the set of grayscale frames 160, in some examples the system may perform post-processing to re-colorize the grayscale frames before presenting them to the user of the second user device 190.

In some examples, in cases where the reference frame 130 was encoded in grayscale, the reference frame decoded at the second user device is re-colored 162 using color transfer instructions contained within the transmitted metadata 180. In some examples, the re-coloring process restores the original color information to the reference frame based on the metadata 180. Then, after re-coloring the reference frame at the second user device 190, the color reference frame may be used to re-color the sequence of grayscale frames into a sequence of color frames 164. The system may perform the re-colorization of the sequence of frames 162 by applying the chrominance parameters from the reference frame to the other frames in the sequence.

In some examples, the color transfer process for the reference frame differs from that of the sequence of frames. For instance, the reference frame may be re-colored back to its original state (e.g., matching reference frame 130 captured by the camera 112 of the first computing device 110), restoring its initial chrominance values. In some examples, the chrominance parameters of the sequence of frames are re-applied in accordance with the chrominance parameters of the reference frame.

In the example of FIG. 1, the second user device 190 is shown in two different states side by side. On the left, a video stream 170 shows the original video feed without any color or luminance adjustments, highlighting the visual inconsistencies caused by changes in screen brightness at the first user device 110. Video stream 170 (presented on the second user device 190) illustrates the effect of rapid changes in screen brightness at the first user device 110 if the captured sequence of frames 135 are not normalized. On the right, a video stream 175 shows the adjusted video feed (e.g., using the normalization process described herein), wherein the visual parameters of the sequence of frames 135 have been normalized and colorized in accordance with the reference frame 130 and metadata instructions 180.

FIG. 1 illustrates one example process for normalization, wherein the steps include (1) converting reference frame to grayscale along with the sequence of frames, (2) normalizing the frames based on the luminance of the reference frame, (3) encoding and transmitting the reference frame and sequence of frames as encoded grayscale frames to the second user device, (4) decoding the received bitstream back into a sequence of grayscale frames, (5) converting the reference frame back to a color frame using metadata, and then (6) converting the sequence of decoded grayscale frames back to a sequence of color frames using the color information from the re-colorized reference frame.

Figure 2:
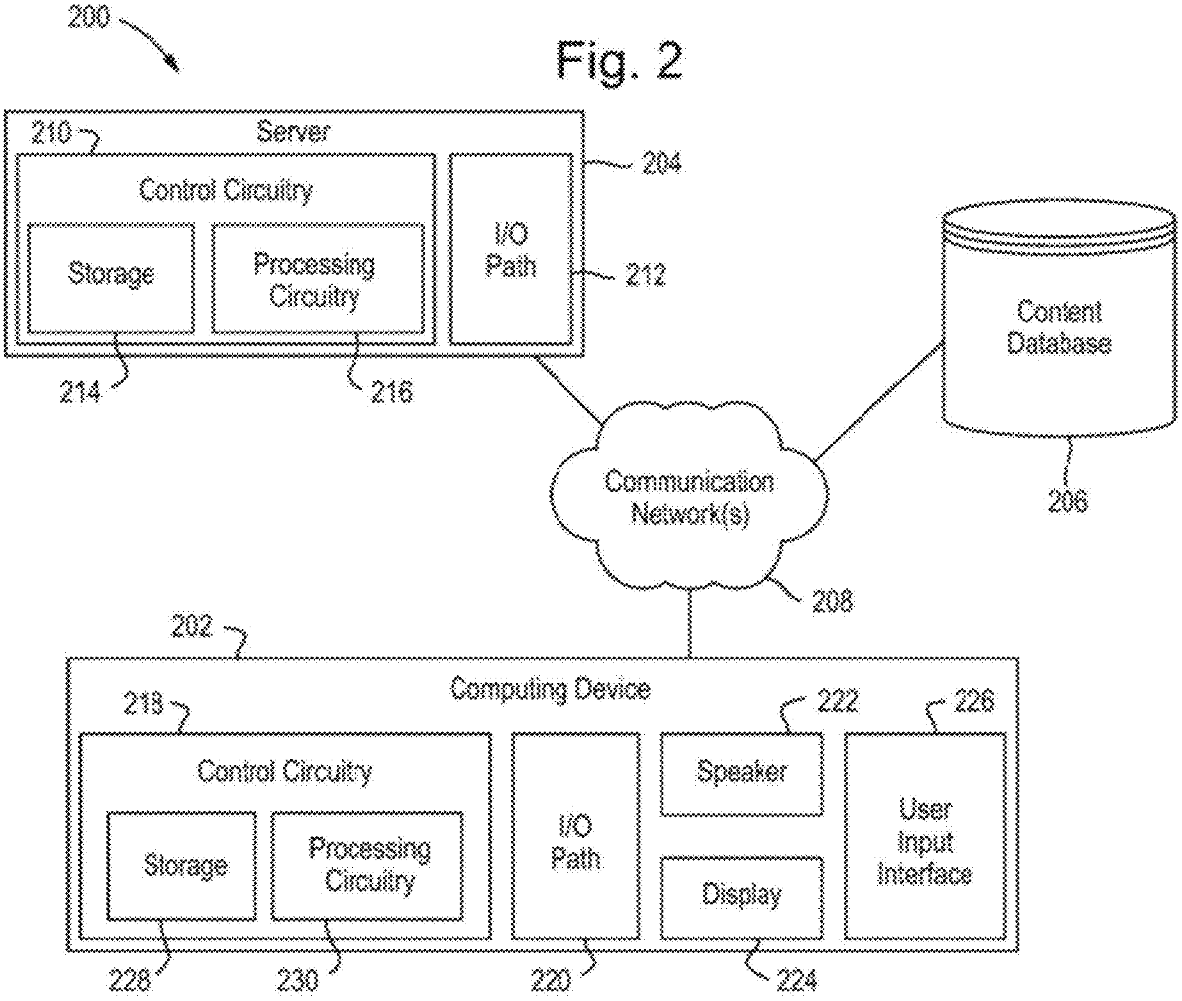
FIG. 2 is a block diagram showing components of an exemplary system for improving video streaming efficiency, in accordance with some examples of the disclosure.

FIG. 2 is an illustrative block diagram showing exemplary system 200 configured to improve video streaming efficiency. Although FIG. 2 shows system 200 as including a number and configuration of individual components, in some examples, any number of the components of system 200 may be combined and/or integrated as one device, e.g., as user device 110. System 200 includes computing device 202 (e.g., user device 110), server 204 (e.g., server 105), and content database 206 (e.g., storage 120 or database 125), each of which is communicatively coupled to communication network 208 (e.g., of system 100), which may be the Internet or any other suitable network or group of networks. In some examples, system 200 excludes server 204, and functionality that would otherwise be implemented by server 204 is instead implemented by other components of system 200, such as computing device 202. In still other examples, server 204 works in conjunction with computing device 202 to implement certain functionality described herein in a distributed or cooperative manner.

Server 204 includes control circuitry 210 and input/output (hereinafter "I/O") path 212, and control circuitry 210 includes storage 214 and processing circuitry 216. Computing device 202, which may be a personal computer, a laptop computer, a tablet computer, a smartphone, a smart television, a smart speaker, or any other type of computing device, includes control circuitry 218, I/O path 220, speaker 222, display 224, and user input interface 226, which in some examples provides a user selectable option for enabling and disabling the display of modified subtitles. Control circuitry 218 includes storage 228 and processing circuitry 220. Control circuitry 210 and/or 218 may be based on any suitable processing circuitry such as processing circuitry 216 and/or 220. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some examples, processing circuitry may be distributed across multiple separate processors, for example, multiple of the same type of processors (e.g., two Intel Core i9 processors) or multiple different processors (e.g., an Intel Core i7 processor and an Intel Core i9 processor).

Each of storage 214, storage 228, and/or storages of other components of system 200 (e.g., storages of content database 206, and/or the like) may be an electronic storage device. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 2D disc recorders, digital video recorders (DVRs, sometimes called personal video recorders, or PVRs), solid state devices, quantum storage devices, gaming consoles, gaming media, or any other suitable fixed or removable storage devices, and/or any combination of the same. Each of storage 214, storage 228, and/or storages of other components of system 200 may be used to store various types of content, metadata, and or other types of data. Non-volatile memory may also be used (e.g., to launch a boot-up routine and other instructions). Cloud-based storage may be used to supplement storages 214, 228 or instead of storages 214, 228. In some examples, control circuitry 210 and/or 218 executes instructions for an application stored in memory (e.g., storage 214 and/or 228). Specifically, control circuitry 210 and/or 218 may be instructed by the application to perform the functions discussed herein. In some implementations, any action performed by control circuitry 210 and/or 218 may be based on instructions received from the application. For example, the application may be implemented as software or a set of executable instructions that may be stored in storage 214 and/or 228 and executed by control circuitry 210 and/or 218. In some examples, the application may be a client/server application where only a client application resides on computing device 202, and a server application resides on server 204.

The application may be implemented using any suitable architecture. For example, it may be a stand-alone application wholly implemented on computing device 202. In such an approach, instructions for the application are stored locally (e.g., in storage 228), and data for use by the application is downloaded on a periodic basis (e.g., from an out-of-band feed, from an Internet resource, or using another suitable approach). Control circuitry 218 may retrieve instructions for the application from storage 228 and process the instructions to perform the functionality described herein. Based on the processed instructions, control circuitry 218 may determine what action to perform when input is received from user input interface 226.

In client/server-based examples, control circuitry 218 may include communication circuitry suitable for communicating with an application server (e.g., server 204) or other networks or servers. The instructions for carrying out the functionality described herein may be stored on the application server. Communication circuitry may include a cable modem, an Ethernet card, or a wireless modem for communication with other equipment, or any other suitable communication circuitry. Such communication may involve the Internet or any other suitable communication networks or paths (e.g., communication network 208). In another example of a client/server-based application, control circuitry 218 runs a web browser that interprets web pages provided by a remote server (e.g., server 204). For example, the remote server may store the instructions for the application in a storage device. The remote server may process the stored instructions using circuitry (e.g., control circuitry 210) and/or generate displays. Computing device 202 may receive the displays generated by the remote server and may display the content of the displays locally via display 224. This way, the processing of the instructions is performed remotely (e.g., by server 204) while the resulting displays, such as the display windows described elsewhere herein, are provided locally on computing device 202. Computing device 202 may receive inputs from the user via input interface 226 and transmit those inputs to the remote server for processing and generating the corresponding displays.

A user may send or input instructions (e.g., to initiate a video stream, adjust video settings, select a reference frame, etc.) to control circuitry 210 and/or 218 using user input interface 226. User input interface 226 may be any suitable user interface, such as a remote control, trackball, keypad, keyboard, touchscreen, touchpad, stylus input, joystick, voice recognition interface, gaming controller, or other user input interfaces. User input interface 226 may be integrated with or combined with display 224, which may be a monitor, a television, a liquid crystal display (LCD), an electronic ink display, or any other equipment suitable for displaying visual images.

Server 204 and computing device 202 may transmit and receive content and data via I/O path 212 and 220, respectively. For instance, I/O path 212 and/or I/O path 220 may include a communication port(s) configured to transmit and/or receive (for instance to and/or from content database 206), via communication network 208, content item identifiers, content metadata, natural language queries, and/or other data. Control circuitry 210, 218 may be used to send and receive commands, requests, and other suitable data using I/O paths 212, 220.

Figure 3:
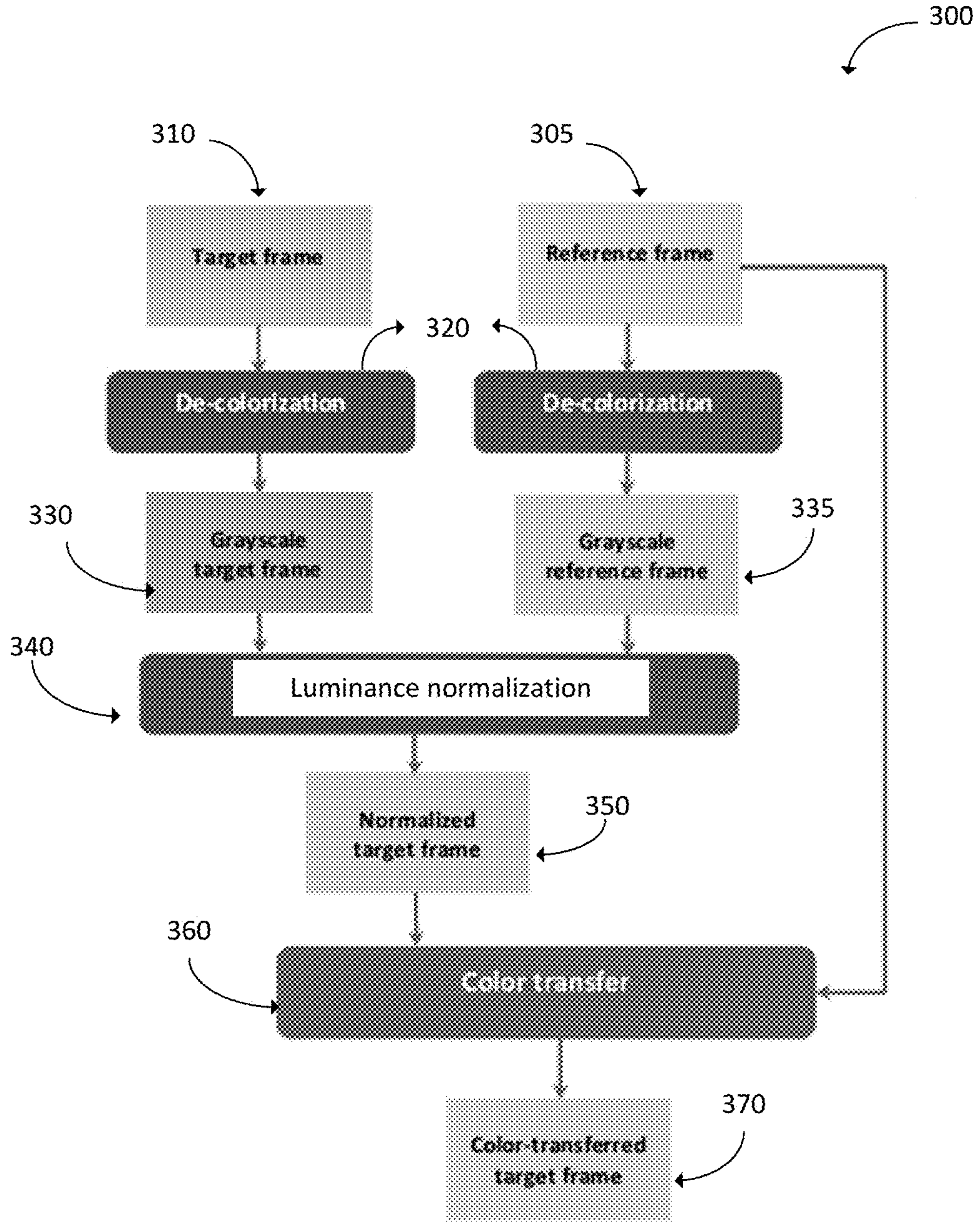
FIG. 3 is a flowchart representing a process for luminance normalization, in accordance with some examples of the disclosure.

FIG. 3 is a flowchart representing an illustrative process 300 for luminance normalization and color transfer in accordance with some examples of the disclosure. The process 300 may be performed by a video application configured to improve temporal consistency and compression efficiency in video streaming, as noted above. In some examples, the process of luminance normalization begins with the identification of a target frame 310 (e.g., from a sequence of frames 135) and a reference frame 305 (e.g., reference frame 130). The term "target frame" as used herein may refer to a frame of the sequence of frames that the application has selected to be de-colorized and luminance normalized. That is, within the context of a video conference wherein many frames are captured, each of the captured frames may be selected as a target frame to be luminance normalized by the process shown in FIG. 3. For example, in FIG. 1, each frame of the sequence of frames 135 captured by the camera 112 may become the "target frame" illustrated in FIG. 3, thereby enabling the process 300 to convert each of the sequence of frames 135 into respective grayscale frames 140, and thereafter luminance normalized grayscale frames 145.

In some examples, the application automatically identifies the target frame 310 and/or the reference frame 305 by obtaining one or both of the target frame 310 and the reference frame 305 from a video feed captured by a device (e.g., camera 112, device 110, and/or device 202). For example, the application may retrieve the reference frame 305 from the storage 120, and may retrieve or select the target frame 310 from the sequence of frames 135 captured by the camera 112. In other examples, the application identifies the target frame 310 and/or the reference frame 305 based on user input (e.g., a user input selection of the target frame 310 and/or reference frame via the device 110 and/or device 202). As noted above, in some examples the application may select the reference frame 305 automatically, and without user input. For example, the application may identify a series of sequential frames for which there is less than a threshold change in color, luminance, or some other metric. The application may then identify from this series of sequential frames, the reference frame 305.

After identifying the target frame 310 and the reference frame 305, in some examples, both frames are subjected to a de-colorization process 320 (e.g., converted to grayscale 140 as in FIG. 1), where the color information is removed to produce grayscale versions of the frames. In FIG. 3, the target frame 310 is de-colorized into grayscale target frame 330, and the reference frame 305 is de-colorized into grayscale reference frame 335. It should be appreciated that while in FIG. 3 the application performs the same de-colorization process 320 for both the target frame 310 and the reference frame 305, in other examples a different de-colorization process may be performed for these frames, and/or the de-colorization process 320 may be performed for only one of the target frame 310 and/or the reference frame 305.

The process of de-colorization 320 may remove chrominance data from the target frame 310 and/or reference frame 305, thereby simplifying the subsequent luminance normalization process 340. By converting the target and/or reference frames into grayscale frames, the luminance normalization is more easily performed by allowing the luminance normalization process to focus on brightness levels in each frame without the complexity introduced by color information.

Once de-colorized, the grayscale target frame 330 and the grayscale reference frame 335 may undergo a luminance normalization process 340 (e.g., as illustrated at 145 in FIG. 1). In an example, the luminance levels of the target frame 330 are adjusted to match the luminance levels of the reference frame 335. In some examples, the luminance normalization process involves scaling the brightness of each pixel in the grayscale target frame 330 so that it aligns, matches, or is identical to the luminance level of the corresponding pixel in the grayscale reference frame 335. It should be appreciated that luminance normalization may be performed on a pixel-to-pixel basis, on groups of pixels, and/or on other portions or segments of the target and/or reference frames. Additionally, while in some examples luminance normalization may include modifying the luminance levels or values of individual pixels of the target frame to match those of the reference frame, it should be appreciated that other techniques or processes may be used to perform luminance normalization. That is, in addition to or instead of modifying the luminance of each pixel of the target frame based on the luminance of the corresponding pixel of the reference frame, other data may be used in making the modifications to the pixels of the target frame. For instance, the luminance normalization process may include pre- or post-processing operations that consider luminance values and/or other data of multiple pixels of the target frame when determining the luminance value for a pixel of the target frame (e.g., an average luminance for a given area of the reference frame). Furthermore, other luminance normalization techniques may be used instead of or in addition to those described herein. As a result of the luminance normalization process 340, the application determines a normalized target frame 350 that exhibits consistent brightness levels corresponding to the reference frame 335.

In the example illustrated in FIG. 3, the application performs luminance normalization at 340 based on the grayscale target frame 330 and the grayscale reference frame 335. However, it should be appreciated that in other examples, the reference frame 305 may be used instead, and the step of de-colorizing the reference frame 305 at step 320 into the grayscale reference frame 335 may be avoided. That is, the application may identify the luminance values of the reference frame 305 without first converting the reference frame into the grayscale reference frame 335. The luminance normalization at step 340 may then be performed based on the grayscale target frame 330 being modified by the luminance values extracted from the reference frame 305 itself (e.g., wherein the reference frame 305 comprises a color reference frame).

In some examples, normalizing luminance across successive frames simplifies video compression by reducing the variability in brightness levels, leading to more efficient data encoding and improved overall compression performance. For instance, minimizing visual discrepancies from sudden lighting or exposure changes allows compression algorithms to more efficiently identify and remove redundant information. Successive frames with similar visual characteristics may take fewer computing resources to process, and may lead to less bandwidth usage due to higher compression ratios and smaller file sizes.

Furthermore, in some examples, maintaining consistent luminance across successive frames helps stabilize the bitrate. For instance, variations in luminance may cause fluctuations in the data required to accurately represent each frame. When luminance varies, the application may need to allocate more bits and/or computing resources to the compression algorithm(s) to preserve frame quality, thereby increasing the overall bitrate. Normalizing luminance across successive frames may enable the application to maintain a stable and lower bitrate, as well as decrease bandwidth usage.

In some examples, the process of de-colorization and normalization is continuously applied to successive frames in a video feed. For instance, the reference frame may be captured and updated periodically or in response to changes in the video scene. In some examples, the application may update or determine a new reference frame based on the number of frames that have been captured and/or based on the frame rate (e.g., the application identifies a new reference frame every 50 frames for a frame rate of 50 frames/second). In other examples, the application may update or determine a new reference frame on a longer time scale (e.g., every 10 seconds). In some examples, the video frames may conform to a typical structure including I-frames, P-frames, and/or B-frames. In this case, the application may use each I-frame as a reference frame, and may update the reference frame as each successive I-frame is captured. In other examples, only every second I-frame, third I-frame, or some other spacing of I-frames may be used. Various other reference frame sources, time frames for identifying or updating the reference frame, and/or triggers for identifying or updating the reference frame may be used.

After determining the normalized target frame 350, the application may perform a color transfer 360 to re-color the normalized target frame. In some examples, the original color information from the reference frame 305 is used to re-color the normalized target frame 350 (e.g., after decoding at a second user device 155, as shown below with respect to FIGS. 4A and 4B). For instance, the chrominance parameters of the reference frame that were removed in the de-colorization at step 320 may be applied to the normalized target frame 350. This may include, for instance, the application determining the chrominance parameters (e.g., hue and saturation values) of each pixel of the color reference frame 305. The application may then apply the corresponding chrominance values from the reference frame 305 to each respective pixel of the normalized target frame 350. Similar to the luminance normalization process 340 noted above, performing the color transfer 360 may include the application processing the normalized target frame 350 on a pixel by pixel basis to add the chrominance data from the reference frame 305. In other examples, average chrominance values from groups of pixels of the reference frame 305 may be used to modify the chrominance of one or more pixels of the normalized target frame 350. As a result of the color transfer at 360, the application determines a color-transferred target frame 370 that maintains both the ideal luminance and chrominance values as defined by the reference frame.

Figure 4A:
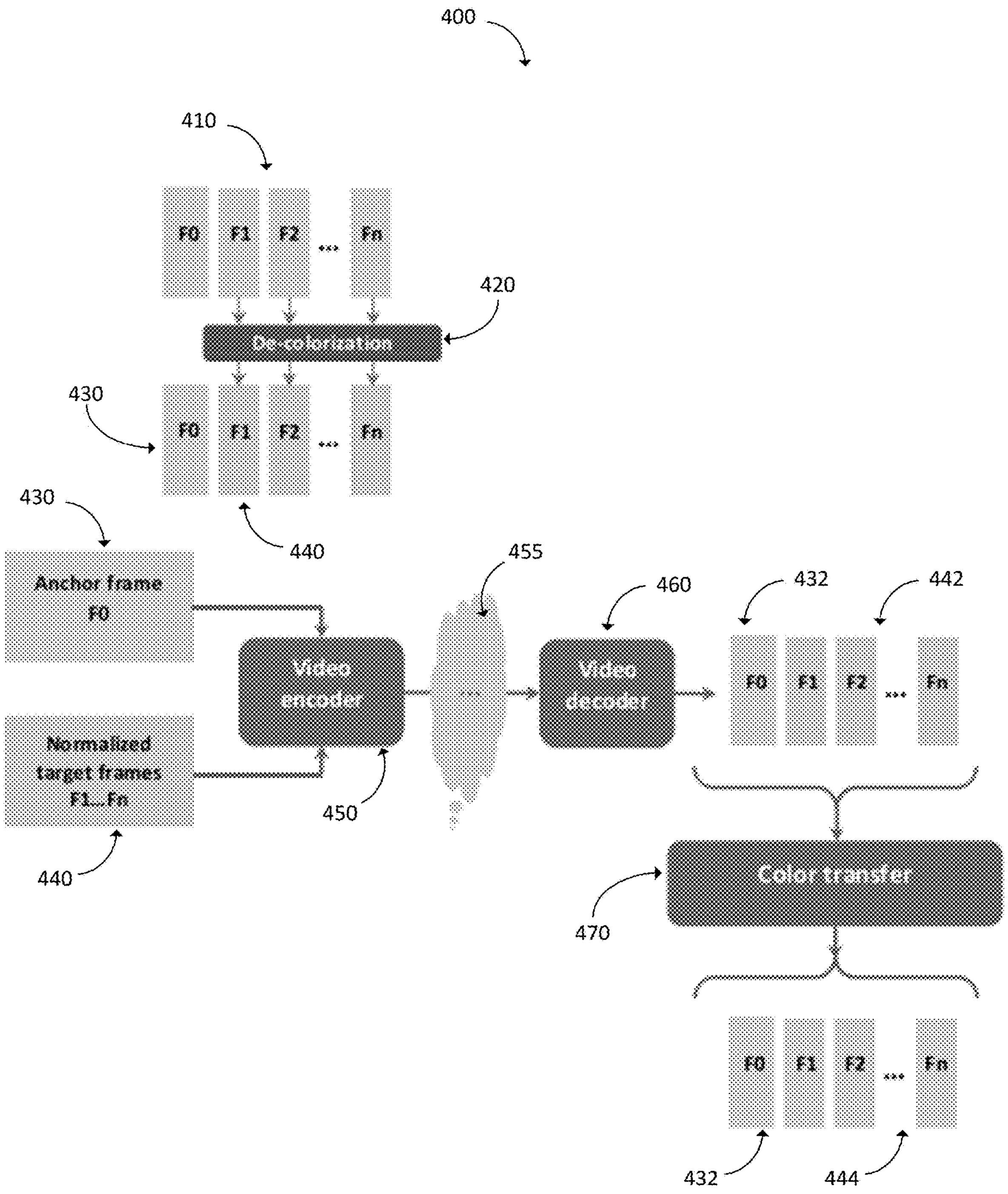
FIG. 4A is a flowchart representing a process for improving compression efficiency in video streaming; in accordance with some examples of the disclosure.
Figure 4B:
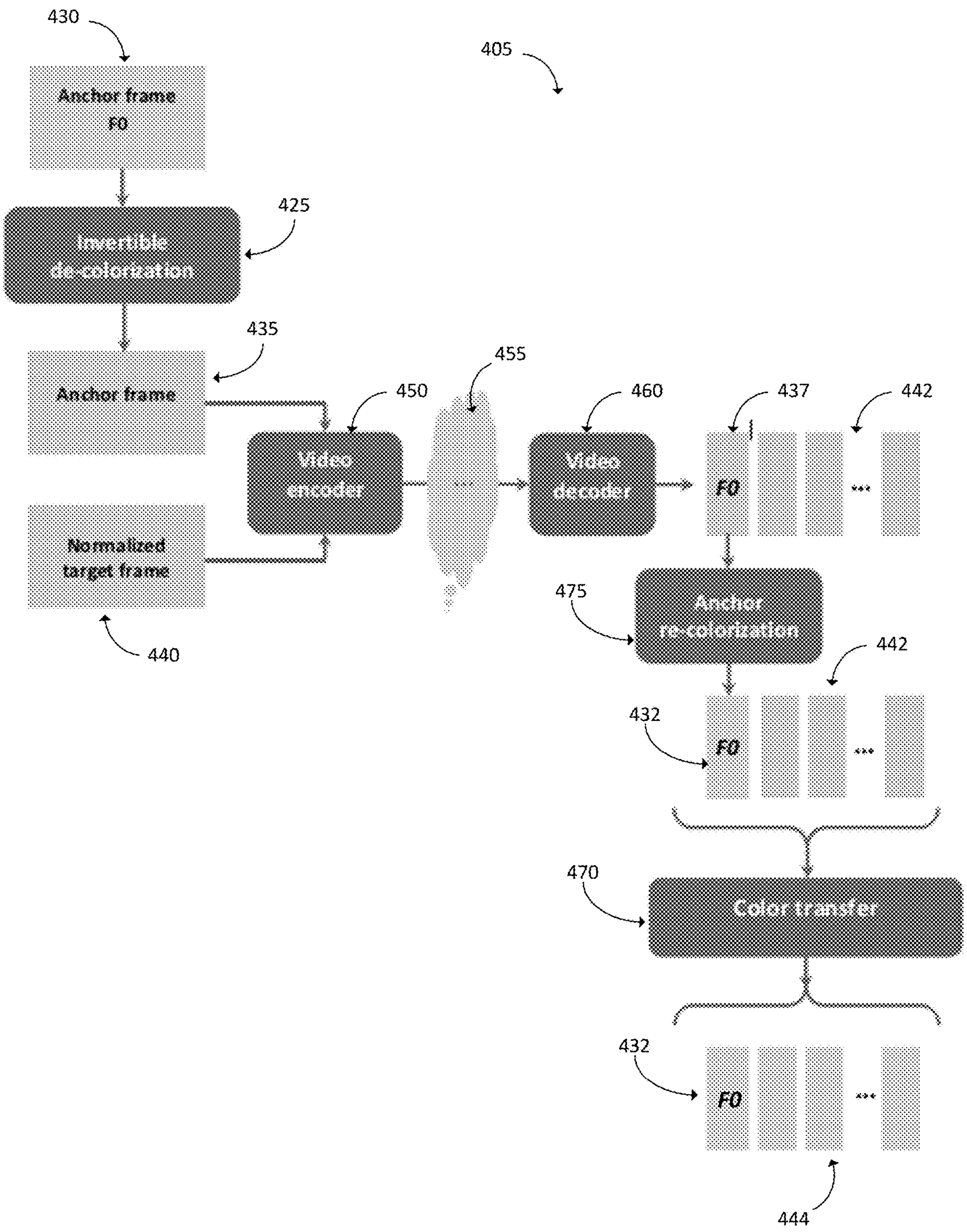
FIG. 4B is a variation of the process shown in FIG. 4A, in accordance with some examples of the disclosure.

FIGS. 4A and 4B are illustrative flowcharts representing processes 400 and 405 for improving compression efficiency in video streaming, in accordance with some examples of the disclosure. FIG. 4A illustrates a process 400 where a reference frame 430 (also referred to as an anchor frame) is communicated in color from a transmitting device to a receiving device via a video stream. In some examples, the process 400 begins with receiving a sequence of frames 410 (e.g., via a video capture by device 110, 112, or 202). In some examples, the received sequence of frames 410 may be captured in color; in other examples, the sequence of frames 410 may be in grayscale or a mix of color and grayscale, such as in scenarios where certain segments of a video stream are captured in grayscale.

In some examples, the received sequence of frames 410 undergoes de-colorization 420 as part of an luminance normalization process, such as the process 320 described above with respect to FIG. 3. De-colorization 420 may involve converting one or more frames of the sequence of frames 410 into grayscale frames, by removing chrominance components of each frame while retaining the luminance information. As shown in FIG. 4A, the de-colorization 420 is performed on frames F1-Fn to generate grayscale frames 440, while frame F0 remains in color and is represented as frame 430. Although not explicitly shown in FIG. 4A, the grayscale frames 440 may further be processed using an luminance normalization process, to generate luminance normalized grayscale frames 440. In some examples, the luminance normalization may occur after de-colorization 420, while in other examples the luminance normalization may occur before or simultaneously with the de-colorization 420.

In some examples, the grayscale frames 440 and the color reference frame 430 are encoded using a video encoder 450 (e.g., of device 110 or 202). The video encoder 450 may also perform compression and/or other data processing on the reference frame 430 and/or normalized grayscale frames 440. The encoded frames are then transmitted via a communication path 455 (e.g., the internet, a dedicated network, or some other communication channel or network) to another device (e.g., a second user device or receiving device). In some examples, metadata comprising instructions and data to enable the receiving device to transfer the color of the reference frame 430 to the sequence of grayscale frames 440 is generated at the first device or transmitting device, and may be communicated along with the encoded frames via the communication path 455.

In some examples, the encoded frames are received and decoded using a video decoder 460 (e.g. at the second or receiving device 190 or 202). The decoder provides a decoded reference frame 432 and a decoded sequence of grayscale frames 442. Since the reference frame 430 was encoded in color, for the example depicted in FIG. 4A, the subsequent color transfer process 470 involves transferring the color from the decoded color reference frame 432 to the sequence of grayscale frames 442, in accordance with the color transfer instructions contained within the metadata (not shown). The color transfer 470 may be similar or identical to color transfer 36 described above with respect to FIG. 3. After the color transfer 470 is performed, the second device includes the decoded color reference frame 432 and a sequence of decoded color frames 444 (corresponding to the original sequence of color frames 410), thereby restoring the original color information to the frames while maintaining the benefits of reduced data size during transmission via the communication path 455. The resulting frames 432,444 may then be presented via a display of the second device.

The color transfer process 470 may comprise a number of steps. In some examples, color transfer 470 may include converting the frames into a suitable color space, followed by statistical matching to align color properties between the frames and the reference frame, and then applying a transformation function to achieve detailed color matching between the decoded color reference frame 432 and the decoded grayscale frames 442, resulting in the decoded color frames 444.

In some examples, the color transfer process includes converting the reference frame 432 and the sequence of grayscale frames 442 into a suitable color space that facilitates color manipulation e.g., RGB, LAB, YUV, and CIELAB.

In some examples, statistical properties such as the mean and standard deviation of the color channels (the individual components of a color space) in the reference and target frames may be matched. For instance, techniques such as histogram matching or mean-variance normalization may be used to align color distributions of the target frame (e.g., one of frames 442) with the reference frame 432 by adjusting the statistical properties of each color channel to match those of the reference frame 432.

In some examples, a transformation function (e.g., Optimal Transport (OT) frameworks and L2 divergence) is computed to map the colors of the target frame (e.g., one of frames 442) to the reference frame 432. This function may be linear (e.g., applying a simple scaling factor to adjust pixel values) or non-linear (e.g., using a polynomial or logarithmic function to capture more complex relationships) and may be configured to adjust the color of each pixel in the target frame based on the corresponding pixel in the reference frame.

In some examples, the steps described in processes 400 and 405 (as illustrated in FIGS. 4A and 4B) may be combined or ordered in any suitable manner to optimize performance and efficiency. For instance, the de-colorization step 420 could be performed either before or after encoding by the video encoder 450, depending on the specific requirements of the video processing system. Similarly, the luminance normalization (not shown in FIG. 4A or 4B) could be performed at the first device either before or after the de-colorization step 420, or at the second device either before or after the color transfer step 470. In still further examples, the luminance normalization may be integrated with the de-colorization step 420 and/or color transfer step 470.

In some examples, a gradual temporal transition in color transfer between two anchor frames is implemented. That is, the color information or chrominance data for adjacent reference frames may be different, and the application may attempt to gradually transition the changes in color from a first reference frame to a second reference frame by adjusting the color of the intervening sequence of frames. For example, if a first reference frame is entirely red, and a second reference frame is entirely blue, the application may perform a gradual transition from red to blue via the intervening sequence of frames. To accomplish this transition, the application may perform color transfer step 470 based on two or more reference frames (e.g., a first reference frame 432 and a second, subsequent reference frame (not shown)). The application may perform a color transfer process using a weighting function to guide the color transfer, allowing the color of the sequence of frames 442 to transition smoothly from frame to frame within the sequence, wherein the first frame of the sequence F1 has color information that is similar to the reference frame 432 (e.g., frame F0), while the last frame in the sequence 442 (e.g., frame Fn) has color information that is similar to the next reference frame after frame 432 (not shown).

In some examples, the encoding device, e.g., device 105, 110 or 202 may assist the decoding device in performing this gradual transition of color information by signaling the weighting function or weighting values in the bitstream. For example, the signaling may involve the encoding device embedding metadata within the bitstream that specifies how the weighting function should be applied to each frame 442. This metadata may include one or more parameters such as the starting and ending weights for the anchor frames, and the rate of change between frames. The decoding device may receive and process the metadata to adapt the color transfer process 470 accordingly.

FIG. 4B illustrates a process 405 which may be similar or identical to the process 400 described above in one or more respects. Notably, however, process 405 differs from process 400 in that the reference frame 430 is also encoded in grayscale at the encoding device. As shown in FIG. 4B, the reference frame 430 undergoes an invertible de-colorization process 425. That is, the reference frame 430 is modified into a grayscale reference frame 435 using a process that can be reversed (e.g., a mathematical process that can be undone to restore the original color information after the frame is decoded at the decoding device). This process 425 converts the reference frame 430 into grayscale reference frame 435 while retaining the capability to revert it back to its original color state.

In some examples, the grayscale reference frame 435 is converted back into a suitable color space at the decoding device if it was initially converted from a color image at the encoding device. In some examples, chrominance parameters may be stored (e.g., in metadata 180) during the initial de-colorization process 425, and the chrominance parameters may be retrieved and applied to the grayscale reference frame 437 to restore the original hue and saturation values and generate decoded color reference frame 432. In some examples, the invertible de-colorization process 425 involves calculating the complementary color for each pixel. For instance, for an RGB color space, this may include subtracting each color channel's value from the maximum possible value (e.g., 255 in an 8-bit image) which is performed independently for the red, green, and blue channels to achieve the de-colorization.

As with FIG. 4A, the grayscale frames 440 may be converted into luminance normalized frames 440. The luminance normalization step is not shown in FIG. 4B for simplicity and to avoid cluttering the figure. It should be appreciated, however, that the luminance normalized frames 440 may begin as captured color frames that have their chrominance information removed, and then are normalized, such as via the process described above with respect to FIG. 3.

In some examples, the grayscale reference frame 435 and the normalized sequence of grayscale frames 440 are then encoded at the encoding device using the video encoder 450. The encoded frames are then transmitted via the communication path 455. Similar to FIG. 4A, metadata (not shown) comprising color transfer instructions may also be communicated alongside the encoded frames to the decoding device, whereby the metadata contains instructions and data that enables the decoding device to re-color the decoded reference frame 437 (e.g., reverse the de-colorization process 425 by re-coloring the decoded reference frame 437 at step 475), as well as to transfer the color of the re-colored reference frame 432 to the sequence of decoded grayscale frames 442.

In some examples, the encoded frames are decoded using the video decoder 460 (e.g., at the second device 190 or 202), resulting in a decoded grayscale reference frame 437 and a sequence of decoded grayscale frames 442. In some examples, the decoded grayscale reference frame 437 undergoes a re-colorization process 475, where the de-colorization process 425 is reversed, and the original color information is restored based on the color transfer instructions contained in the metadata. In some examples, the re-colorization of the decoded grayscale reference frame 437 involves inverting the grayscale values back to their original chrominance values, effectively transforming the grayscale reference frame into a decoded color reference frame 432.

After re-colorizing the reference frame into decoded color reference frame 432, the process 405 may include performing color transfer at step 470, which may be similar or identical to step 470 described above with respect to FIG. 4A. The application uses the decoded color reference frame 432 to transfer color information to the sequence of decoded grayscale frames 442 through color transfer step 470, resulting in a sequence of decoded color frames 444, which are now ready for display or further processing. The decoded color reference frame 432 and decoded color frames 444 may then be presented for display by the decoding device.

Figure 5:
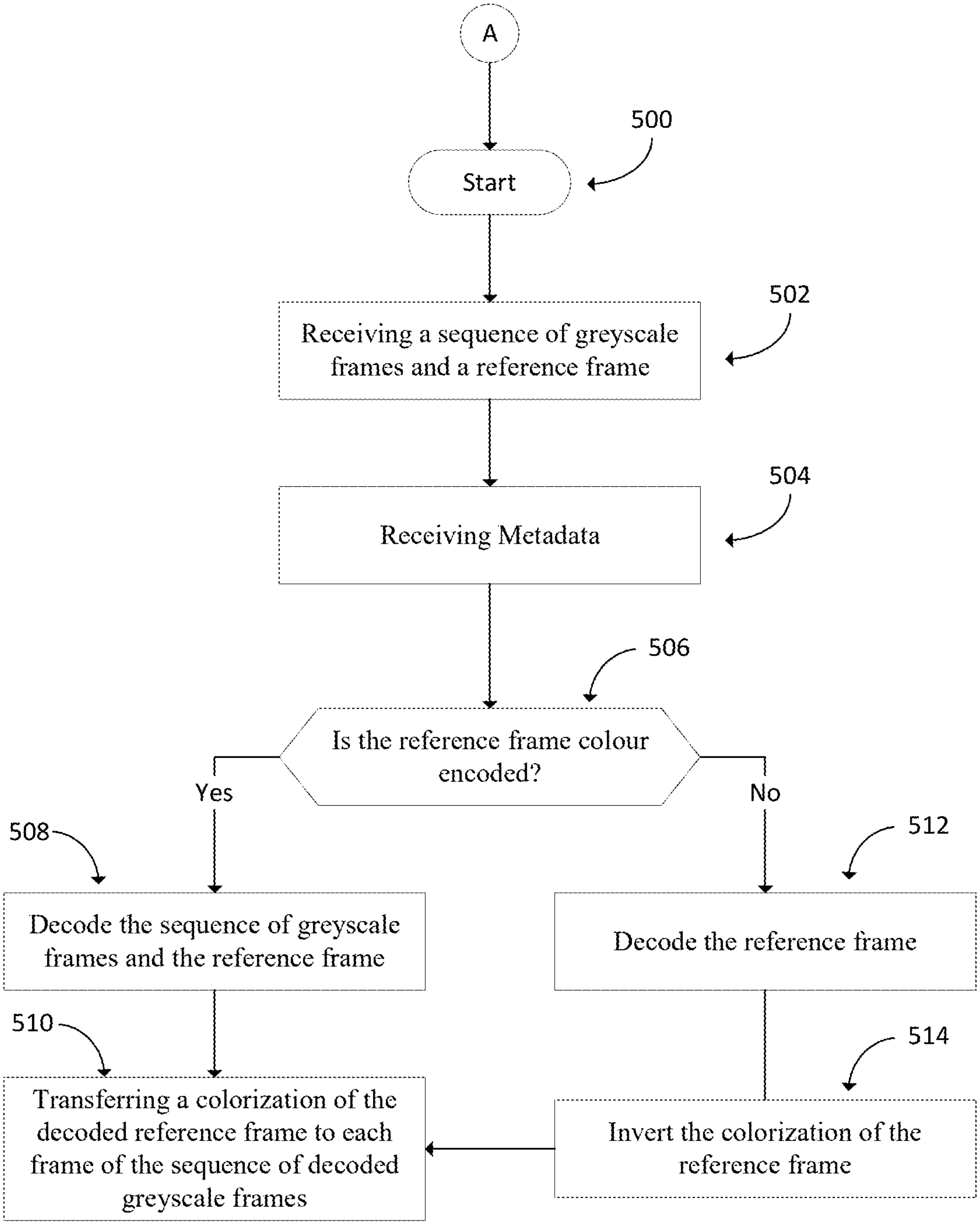
FIG. 5 is a flowchart representing a process for receiving, decoding, and colorizing grayscale frames in a media content item, in accordance with some examples of the disclosure.

FIG. 5 is a flowchart representing an illustrative process 500 for receiving, decoding, and colorizing grayscale frames of a media content item, in accordance with some examples of the disclosure. While the examples shown in FIG. 5 refer to the use of system 100, as shown in FIG. 1, it will be appreciated that the illustrative process shown in FIG. 5, and any of the other illustrative processes described herein, may be implemented on system 100, either alone or in combination with any other appropriately configured system architecture, such as system 200 shown in FIG. 2.

At step 502, control circuitry receives encoded frames of a media content item. In some examples, the encoded frames consist of a sequence of grayscale frames and a reference frame (which may be colored or may be grayscale). These frames may be captured in real-time by a camera such as camera 112 of a user device (e.g., user device 110 or computing device 202) and transmitted over a network (e.g., network 208 of system 200, and/or network 455 of FIGS. 4A and 4B) to a decoding device for further processing. The reference frame, which can be either color or grayscale, may be captured and/or updated periodically or in response to specific changes in the video feed. The encoded frames may be stored temporarily in a server database (e.g., database 125 or content database 206) before further processing, or they may be transmitted directly from one user device to another (e.g., from user device 110 to user device 190).

At step 504, control circuitry receives metadata associated with the reference frame. The metadata may include color transfer instructions for the subsequent color transfer process. The metadata may be transmitted alongside the encoded frames from the capturing device (e.g., user device 110 or computing device 202) over the network (e.g., network 208 and/or network 455) to the receiving device or server (e.g., server 105 or 204). In some examples, the metadata contains chrominance parameters (e.g., hue and saturation values) and synchronization instructions for synchronizing processes for color transfer during a video stream. In some examples, the metadata may be processed by an intermediary server (e.g., server 105) before being forwarded to the receiving device (e.g., user device 190). In some examples, in scenarios involving multiple reference frames (e.g., where the system performs a gradual color transition in the sequence of frames from one reference frame to the next), the metadata includes instructions for each reference frame and/or weighting values, detailing how to apply color transfer across different segments of the video stream.

At step 506, control circuitry determines whether the reference frame is color encoded, directing the flow of the process into pathways for either color-encoded or grayscale-encoded reference frames. In some examples, control circuitry checks the metadata for a flag or parameter indicating the encoding status, with this information being parsed by circuitry from devices such as user device 110 or computing device 202. If the reference frame is color-encoded, the process proceeds with the pathway for color reference frames. In some examples, the control circuitry might analyze the reference frame itself, inspecting one or more pixel values to check for chrominance components. In server-based implementations (e.g., server 105 or 204), the server may determine the encoding status by analyzing the incoming reference frame and/or metadata, then directing the processing steps accordingly.

If the reference frame is color-encoded, the process moves to step 508, where control circuitry decodes the sequence of grayscale frames and the reference frame. Decoding may involve converting the compressed and encoded data back into a format that can be processed further, resulting in a sequence of decoded grayscale frames and a decoded color reference frame. In some examples, hardware decoders within devices (e.g., user device 110 or computing device 202) are utilized to perform real-time decoding using protocols such as H.264, and/or HEVC (High-Efficiency Video Coding). In some examples, software-based decoders are employed in compression formats such as AV1, and/or H.265. Other decoding techniques, such as parallel processing and error correction algorithms, may be used. Additionally, machine learning models may be integrated to predict and correct unwanted artifacts left during the encoding decoding process. Protocols such as RTP (Real-time Transport Protocol) may be used for real-time transmission.

In some examples, the decoded frames may be temporarily stored in one or more buffers (e.g., storage 214 or 228) to facilitate subsequent processing steps. In some examples, the server (e.g., server 105) handles the decoding before transmitting the decoded frames to the user device. This may involve protocols such as DASH (Dynamic Adaptive Streaming over HTTP) or HLS (HTTP Live Streaming) to manage adaptive bitrate streaming.

Following the decoding in step 508, the process advances to step 510, where the color of the decoded reference frame is transferred to each frame in the sequence of decoded grayscale frames. This involves applying chrominance parameters (e.g., hue and saturation values) from the reference frame to the grayscale frames, effectively restoring the original color information. In some examples, control circuitry within a user device (e.g., user device 110 or computing device 202) retrieves these parameters and applies them pixel-by-pixel, ensuring high fidelity and accurate color restoration. Techniques such as interpolation may be used to enhance smoothness and continuity of color transitions.

In other examples, a block-based approach is used, where the grayscale frames are divided into blocks or regions, and chrominance parameters from the reference frame are applied to each block. Advanced algorithms, like color transfer functions or machine learning models may also be used. Additionally, the process may prioritize certain areas, such as foreground subjects or objects that move from frame to frame. In some examples, image analysis may be performed on one or more frames (e.g., the reference frame) to identify key objects or subjects that may be used to steer prioritization of the color conversion at step 510.

If the reference frame is not color-encoded, the process follows the alternative pathway from step 506 to step 512. In step 512, the control circuitry decodes the grayscale reference frame by converting the compressed grayscale reference frame data back into a usable format as a decoded grayscale reference frame.

After decoding the grayscale reference frame in step 512, the process proceeds to step 514, where the color of the decoded grayscale reference frame is inverted. This step involves converting the grayscale values back to their original chrominance values based on the color transfer instructions in the metadata (e.g., as described above with respect to step 475 of FIG. 4B). In some examples, the control circuitry uses a look-up table or transformation function provided in the metadata to map the grayscale values to their corresponding chrominance values to reconstruct the original color state of the reference frame.

In some examples, techniques such as machine learning models are used to perform the color inversion. These models may learn the relationship between grayscale and color values from training data, enabling them to generate re-colorized frames. In some examples, in scenarios where the reference frame contains regions of varying importance, the inversion process may prioritize the color reconstruction of critical areas, such as foreground subjects, while applying a simpler color transfer to the background. In some examples, once the color of the reference frame is inverted, control circuitry implements step 510 to transfer the color to the sequence of grayscale frames.

Figure 6:
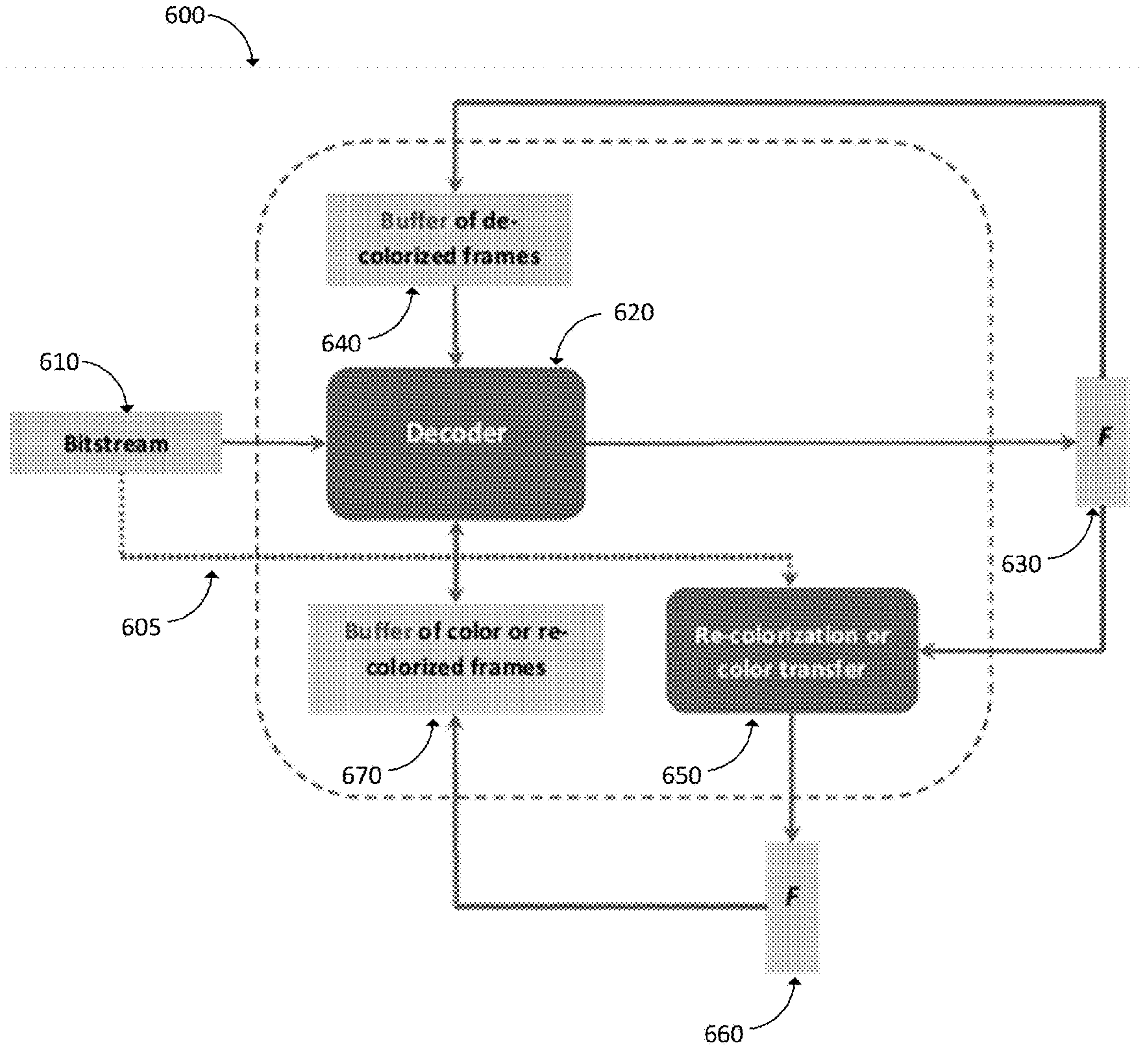
FIG. 6 illustrates a diagrammatic representation of an in-loop color transfer process, in accordance with some examples of the disclosure.

FIG. 6 illustrates a system 600 for in-loop color transfer of the decoded frames, in accordance with some examples of the disclosure. In some examples, an in-loop color transfer process at the decoding device integrates the color transfer step within the decoding loop, e.g., during the real-time decoding of received video frames. That is, in some examples, the decoding device receives a bitstream that includes (i) one or more encoded reference frames (which may be color reference frames, grayscale reference frames, or a combination of both), (ii) a sequence of encoded grayscale frames (e.g., frames 145 in FIG. 1, and/or and frames 442 in FIGS. 4A and 4B), and (iii) metadata or color transfer instructions that the decoding device can use to turn the sequence of grayscale frames into a sequence of color frames to be displayed. The examples of FIGS. 1-5 may be illustrated as including a linear decoding process that utilizes post-processing at the decoding device, wherein each received grayscale frame is decoded into a decoded grayscale frame and then converted into a decoded color frame using the decoded color reference frame (e.g., as described above with respect to FIGS. 1-5).

FIG. 6, in contrast to the examples of FIGS. 1-5, illustrates an in-loop color transfer of received frames, wherein one or more of the grayscale frames may be colorized, and then used as a color reference frame for color transfer to subsequent grayscale frames. As each encoded grayscale frame is received, it may be decoded and either (i) stored in a grayscale buffer (e.g., buffer 640), or (ii) converted to a color frame (e.g., using the metadata 605) to be used as a reference frame for re-colorization of subsequent grayscale frames. That is, the decoding loop illustrated FIG. 6 enables each received grayscale frame to be used as a reference frame for color transfer to subsequent frames.

As shown in FIG. 6, the process starts with the decoding device receiving a bitstream 610 that includes the encoded reference frame and encoded series of frames. The bitstream 610 may originate from various sources such as a first user device or encoding device (e.g., user device 110 or computing device 202) or a server (e.g., server 105). The bitstream 610 may include encoded frames, including a sequence of encoded grayscale frames and an encoded reference frame that may be in grayscale or in color. Additionally, the bitstream may include metadata 605, comprising color transfer instructions. In some examples, the metadata 605 may be sent separately from the encoded frames.

In some examples, the received bitstream 610 is processed by the decoding circuitry 620, which is part of a decoding device (e.g., device 190 or 202). The control circuitry within the decoding device 620 may analyze the content of the bitstream 610 and the metadata 605 to determine the appropriate processing pathway. For instance, if one or more of the received frames are encoded in grayscale 630 (e.g., as in FIGS. 4A and 4B), the received encoded frames are decoded into grayscale frames 630 and stored in a grayscale buffer 640. These grayscale frames may be stored temporarily until a frame is required for display.

In some examples, when a grayscale frame needs to be displayed in color, it undergoes a color transfer process. As shown in FIG. 6, this may involve using the color reference frame 660 along with the color transfer instructions from the metadata 605 to apply the correct chrominance parameters to the grayscale frame. The resulting colorized frames may then be stored in a color buffer 670, ready for display.

In some examples, a grayscale frame may be used as a reference frame for color transfer to subsequent frames. The decoded grayscale frame 630 may be converted into a color frame at step 650, and thereby converted into a color reference frame 660. The color reference frame 660 may then be stored in the color buffer 670, and/or may be used in the decoding process for inter-prediction and processing of subsequent frames.

The grayscale buffer 640 and the color buffer 670 are described in some examples as being separate buffers. However, it should be appreciated that in some examples, the buffers 640 and 670 may be included in the same storage medium, and the distinction may simply be a difference in the portion of the storage medium, the pointers used to access the buffer, and/or some other software-based distinction. Both the grayscale buffer 640 and the color buffer 670 may share space within the relevant storage medium of the decoding device, and may be distinct only insofar as is needed for purposes of explanation with respect to the examples described herein.

In some examples, in scenarios where the received reference frame is also grayscale (e.g., as in FIG. 4B), the color of the grayscale reference frame is first inverted at 650 back to its original chrominance parameters based on the metadata instructions 605. This inversion reconstructs the original color state of the reference frame into a color reference frame 660. The colorized reference frame 660 may then be stored in the color buffer 670, ready for use in the color transfer of subsequent grayscale target frames.

In some examples, by performing color transfer during the process of decoding the received bitstream, the system can utilize the reference frame immediately, ensuring that color information is consistently applied across all frames when required. Furthermore, the metadata 605 can include detailed color transfer instructions that adapt to various video segments, e.g., to ensure that each frame is colorized correctly according to the specific requirements of the content.

In scenarios where multiple reference frames are used, the system can dynamically switch between different reference frames stored in the color buffer 670 based on the metadata 605. This approach may be useful for videos with varying scenes and lighting conditions.

In some examples, the system also supports inter-prediction that uses one or more reference frames or a first sequence of decoded frames to predict the composition of one or more subsequent frames. In this context, once a reference frame or an initial sequence of frames is decoded and colorized, these decoded and colorized frames may be used as predictors for subsequent frames. This predictive mechanism may allow the system to encode and decode video by leveraging the information from previous frames to estimate the content of future frames. For instance, during the encoding process, the encoder may analyze the reference frame and the initial sequence of colorized frames to determine motion vectors and other predictive parameters. These parameters may then be used to encode subsequent frames more efficiently by predicting their composition based on the previously decoded frames. At the decoding end, the same parameters may be used to reconstruct subsequent frames. Inter-prediction may reduce the amount of data that needs to be transmitted, as only the differences between frames and the predictive parameters need to be encoded and transmitted.

Figure 7A:
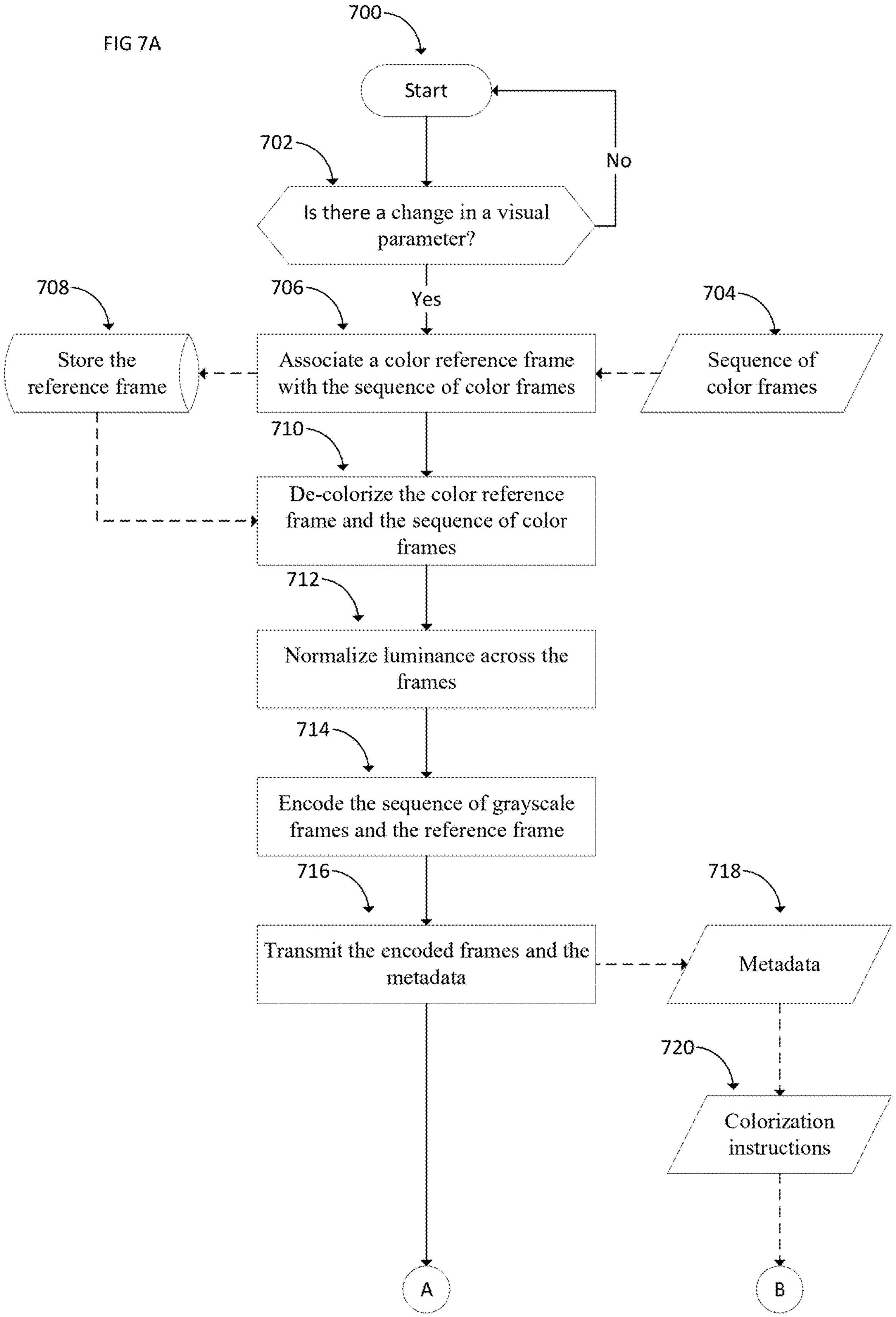
FIG. 7A is a flowchart representing a process for encoding a sequence of grayscale frames, in accordance with some examples of the disclosure.
Figure 7B:
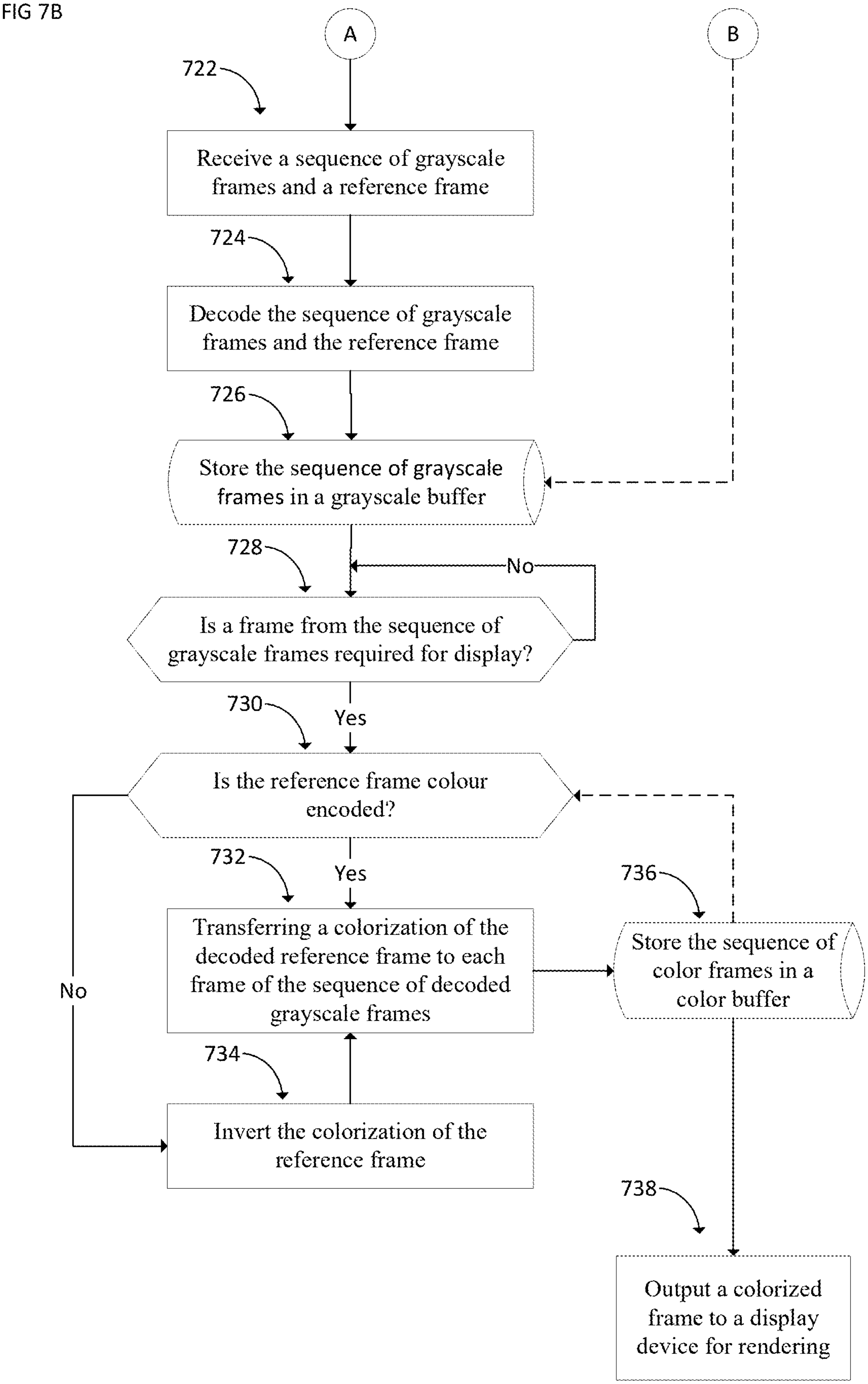
FIG. 7B is a flowchart representing a process for receiving, decoding and buffering encoded frames, in accordance with some examples of the disclosure.

FIGS. 7A and 7B show a flowchart representing a process for encoding, communicating, receiving, decoding, and colorizing grayscale frames of a media content item, in accordance with some examples of the disclosure. While the example shown in FIGS. 7A and 7B refers to the use of system 100, as shown in FIG. 1, it will be appreciated that the illustrative process shown in FIGS. 7A and 7B, and any of the other following illustrative processes, may be implemented on system 100, either alone or in combination with any other appropriately configured system architecture, such as system 200.

In some examples, the described process in FIGS. 7A and 7B can be applied across a wide range of applications, such as video conferencing platforms, real-time video calls, video capture for gaming, live broadcasting, security camera feeds, and virtual reality environments, for example.

At step 702, the system (e.g., circuitry 210 or 218) determines whether there is a change in a visual parameter of captured video, such as brightness, contrast, or color saturation. For instance, a change in lighting conditions captured by the user device (e.g., user device 110, camera 112, and/or computing device 202) may trigger this detection. In some examples, changes result from environmental factors such as moving from a brightly lit area to a darker one or clouds moving to block the sun, or from content changes on the screen, such as switching from a dark scene, application, or slide to a brightly lit one. If a change is detected, the system (e.g., circuitry 210 or 218) proceeds to step 706.

At step 706, the system (e.g., circuitry 210 or 218) associates a color reference frame 708 with the sequence of color frames 704. In some examples, this reference frame acts as a benchmark for normalizing visual parameters across the sequence, as described above. For example, during a video call, a stable frame where the lighting is optimal and the colors are well-balanced might be selected as the reference frame. In some examples, the color reference frame 708 is stored (e.g., in a storage 120 or 228 of a device 110 or 202). In some examples, the storage is local on the user device or remote on a server (e.g., server 105 or 204).

At step 710 the reference frame and the sequence of color frames are de-colorized (e.g. converted to grayscale). In some examples, the frames are converted into grayscale by removing chrominance information. In some examples, converting the frames to grayscale involves using one or more algorithms to strip away color information while preserving the luminance data for future brightness normalization.

At step 712, the system (e.g., circuitry 210 or 218) normalizes the luminance across the sequence of de-colorized frames. In some examples, the brightness levels of the grayscale frames are adjusted to match the luminance of the reference frame. For instance, if the reference frame represents ideal brightness, the system (e.g., circuitry 210 or 218) scales the luminance of each frame in the sequence to ensure consistent visual appearance with respect to brightness. In some examples, the normalization process uses various techniques, such as histogram equalization or mean-variance normalization, to align the brightness levels.

At step 714, the system (e.g., circuitry 210 or 218) encodes the normalized sequence of grayscale frames and the reference frame. Encoding compresses the video data, making it more efficient for transmission over a network. In some examples, the encoding process uses protocols such as H.264, HEVC, or VP9, depending on the system's (e.g., circuitry 210 or 218) capabilities and requirements.

At step 716 the encoded frames are transmitted (e.g., via network path 208, 455 or any suitable communication network) to a receiving device (e.g., device 190 or 202). In some examples, the encoded reference frame may be transmitted at a higher bitrate than the encoded sequence of frames. In some examples, both the reference frame and the frames of the sequence may be encoded and transmitted in either grayscale or color. In some examples, metadata 718, including color transfer instructions 720, is transmitted alongside the encoded frames. In some examples, the metadata may be encoded and transmitted with the encoded frames. In some examples, transmission can occur over various networks, such as the internet or a dedicated communication path. For instance, the encoded video data along with the metadata might be sent from a user device to a server, which then relays it to other user devices for viewing.

At step 722, the system (e.g., circuitry 210 or 218) receives the encoded stream containing the sequence of grayscale frames and the reference frame (e.g., at a second device 190 or 202). The incoming bitstream may be received from a transmission source, such as a user device (e.g., device 110 or 202) or a server (e.g., server 105), which has transmitted the encoded video data over a network.

At step 724, the system (e.g., circuitry 210 or 218) decodes the sequence of grayscale frames and the reference frame. In some examples, decoding involves converting the compressed data back into a usable format. The decoding process may utilize various protocols such as H.264, HEVC, or VP9, depending on the encoding used. This step may result in a sequence of decoded grayscale frames and a decoded reference frame, ready for further processing.

At step 726, the decoded sequence of grayscale frames is stored in a grayscale buffer. In some examples, this buffer temporarily holds the frames until they are required for display or further processing. In some examples, this grayscale buffer is part of an in-loop process where frames are subsequently colorized as part of the decoding step, as described above with respect to FIG. 6. Alternatively, in other examples, the frames stored in the grayscale buffer may undergo post-processing after decoding, where the color transfer is applied as a separate step following the initial decoding. In some examples, the grayscale buffer is used to store frames that have been de-colorized. For instance, in a YUV color space, the grayscale buffer might store frames which retain the Y component (luminance) and not the UV components, which represent chrominance.

At step 728, the system (e.g., circuitry 210 or 218) determines if a frame is required for display. In some examples, control circuitry monitors the playback or streaming requirements of the video content. For example, in a video conference scenario between two devices, as illustrated in FIG. 1, the system (e.g., circuitry 210 or 218) analyzes the display buffer to check if new frames need to be rendered on the screen.

In some examples, when a new frame is required, a request may be initiated by playback software or an application running on the user's device (e.g., device 190 or 202). The playback software may send a request to the control circuitry (e.g., 210 or 218), which then processes this request by checking the color buffer (if a color frame is required) to retrieve the next frame in the sequence.

For instance, during a videoconference, the system (e.g., device 190 or 202) might detect a change in the video stream that requires updating the displayed frame. In some examples, the playback software detects this change and signals the control circuitry to fetch and process a new frame.

If a frame is required for display, the process proceeds to step 730, where the system (e.g., circuitry 210 or 218) checks if the reference frame is color encoded. If the reference frame is color encoded, the process moves to step 732; if not, it moves to step 734.

At step 732, if the reference frame is color encoded, the system (e.g., circuitry 210 or 218) transfers the color of the decoded reference frame to each frame in the sequence of decoded grayscale frames. For example, by applying chrominance parameters (e.g., hue and saturation values) from the reference frame to the grayscale frames.

After color transfer, the sequence of color frames is stored in a color buffer at step 736. For instance, in a YUV color space, the color buffer might store frames which retain the YUV or UV components (UV components representing chrominance). In some examples, this buffer holds the colorized frames until they are ready for display.

In some examples, system 700 (e.g., control circuitry of display device 190 or an application running on it) continuously checks and requests updated colorized frames. As more frames are required, the control circuitry may request additional grayscale frames to be colorized and stored in the color buffer 736, forming a continuous loop.

In some examples, if the reference frame is not color encoded, the process moves from step 730 to step 734. Here, the system (e.g., circuitry 210 or 218) inverts the color transfer of the reference frame (e.g., as described above with respect to step 475 of FIG. 4B). For example, the grayscale values of the reference frame are converted back to their original chrominance values based on the color transfer instructions in the metadata (e.g., by restoring chrominance values in accordance with color transfer instructions). In some examples, the original color state of the reference frame is restored.

Once the color of the reference frame is inverted, control circuitry (e.g., 210 or 218) implements step 732 to transfer the color of the color reference frame to the sequence of decoded grayscale frames.

At step 738, a colorized frame is output to a display device for rendering. For instance, by transferring the colorized frame from the color buffer to the display device (e.g., device 190 or 202).

The systems and processes discussed above are intended to be illustrative and not limiting. One skilled in the art would appreciate that the actions of the processes discussed herein may be omitted, modified, combined, and/or rearranged, and any additional actions may be performed without departing from the scope of the invention. Furthermore, it should be noted that the features and limitations described in any one example may be applied to any other example herein, and flowcharts or examples relating to one example may be combined with any other example in a suitable manner, done in different orders, or done in parallel. In addition, the systems and methods described herein may be performed in real-time. It should also be noted that the systems and/or methods described above may be applied to, or used in accordance with, other systems and/or methods.

All of the features disclosed in this specification (including any accompanying claims, abstract, and drawings), and/or all of the steps of any method or process so disclosed, may be combined in any combination, except combinations where at least some of such features and/or steps are mutually exclusive.

Each feature disclosed in this specification (including any accompanying claims, abstract, and drawings), may be replaced by alternative features serving the same, equivalent, or similar purpose unless expressly stated otherwise. Thus, unless expressly stated otherwise, each feature disclosed is one example only of a generic series of equivalent or similar features.

The invention(s) are not restricted to the details of any foregoing examples. The invention(s) extend to any novel one, or any novel combination, of the features disclosed in this specification (including any accompanying claims, abstract, and drawings), or to any novel one, or any novel combination, of the steps of any method or process so disclosed. The claims should not be construed to cover merely the foregoing examples, but also any examples which fall within the scope of the claims.

Throughout the description and claims of this specification, the words "comprise" and "contain" and variations of them mean "including but not limited to", and they are not intended to (and do not) exclude other moieties, additives, components, integers, or steps. Throughout the description and claims of this specification, the singular encompasses the plural unless the context otherwise requires. In particular, where the indefinite article is used, the specification is to be understood as contemplating plurality as well as singularity, unless the context requires otherwise.

All of the features disclosed in this specification (including any accompanying claims, abstract, and drawings), and/or all of the steps of any method or process so disclosed, may be combined in any combination, except combinations where at least some of such features and/or steps are mutually exclusive. The invention is not restricted to the details of any foregoing examples. The invention extends to any novel one, or any novel combination, of the features disclosed in this specification (including any accompanying claims, abstract, and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

What is claimed is:

1. A method comprising:

receiving, using control circuitry, encoded frames of a media content item, the encoded frames comprising a sequence of encoded grayscale frames and an encoded reference frame associated with the sequence of encoded grayscale frames, wherein each encoded grayscale frame in the sequence of encoded grayscale frames comprises a luminance parameter normalized to a luminance parameter of the encoded reference frame;

receiving, using control circuitry, metadata for the sequence of encoded grayscale frames, the metadata comprising color transfer instructions for the sequence of encoded grayscale frames;

decoding, using control circuitry, the sequence of encoded grayscale frames and the encoded reference frame to obtain a sequence of decoded grayscale frames and a decoded reference frame;

determining, using control circuitry, for each decoded grayscale frame of the sequence of decoded grayscale frames, a color transfer based on: (i) the color transfer instructions, and (ii) the decoded reference frame; and applying, using control circuitry, the color transfer to each decoded frame of the sequence of decoded grayscale frames, to obtain a sequence of decoded color frames.

2. The method of claim 1, prior to receiving the encoded frames of the media content item, the method comprising:

detecting a change in a luminance parameter between successive frames of the media content item;

based on the detected change, associating a color reference frame with a sequence of color frames, wherein the color reference frame comprises a selected luminance parameter;

de-colorizing the color reference frame and the sequence of color frames to produce a grayscale reference frame and a sequence of grayscale frames; and normalizing a luminance parameter of each grayscale frame in the sequence of grayscale frames to the selected luminance parameter.

3. The method of claim 2, the method comprising:

encoding the color reference frame and the sequence of grayscale frames; and transmitting the encoded frames with the color transfer instructions.

4. The method of claim 2, wherein the de-colorizing the color reference frame is performed in an invertible manner.

5. The method of claim 1, wherein the encoded reference frame is an encoded color reference frame, the method comprising:

decoding the encoded color reference frame to obtain a decoded color reference frame, wherein the color transfer instructions comprise a first instruction to:

apply the color transfer of the decoded color reference frame to each frame of the sequence of decoded grayscale frames to obtain the sequence of decoded color frames.

6. The method of claim 5, further comprising:

storing the sequence of encoded grayscale frames in a first buffer, based on the first instruction:

decoding the sequence of encoded grayscale frames stored in the first buffer; and applying the color transfer of the decoded color reference frame to each frame of the sequence of decoded grayscale frames stored in the first buffer to obtain the sequence of decoded color frames; and storing the sequence of decoded color frames in a second buffer.

7. The method of claim 1, wherein the encoded reference frame is an encoded grayscale reference frame that has been grayscale encoded and that has been generated by way of a de-colorization of a color frame to obtain the encoded grayscale reference frame, the method comprising:

decoding the encoded grayscale reference frame to obtain a decoded grayscale reference frame, the color transfer instructions comprising a second instruction to:

invert the de-colorization to obtain a decoded color reference frame.

8. The method of claim 7, further comprising:

storing the sequence of encoded grayscale frames and the encoded grayscale reference frame in a first buffer, based on the color transfer instructions:

decoding the encoded grayscale reference frame and decoding the sequence of encoded grayscale frames stored in the first buffer; and applying the color transfer of the decoded color reference frame to each frame of the sequence of decoded grayscale frames stored in the first buffer to obtain the sequence of decoded color frames; and storing the sequence of decoded color frames in a second buffer.

9. The method of claim 1, wherein applying the color transfer of the decoded reference frame to the sequence of decoded grayscale frames comprises:

applying chrominance parameters associated with the decoded reference frame to each frame of the sequence of decoded grayscale frames to obtain the sequence of decoded color frames.

10. The method of claim 1, wherein the encoded reference frame is received at a higher bitrate than the sequence of encoded grayscale frames.

11. A system comprising:

input/output circuitry configured to:

receive encoded frames of a media content item, the encoded frames comprising a sequence of encoded grayscale frames and an encoded reference frame associated with the sequence of encoded grayscale frames, wherein each encoded grayscale frame in the sequence of encoded grayscale frames comprises a luminance parameter normalized to a luminance parameter of the encoded reference frame; and receive metadata for the sequence of encoded grayscale frames, the metadata comprising color transfer instructions for the sequence of encoded grayscale frames; and control circuitry configured to:

decode the sequence of encoded grayscale frames and the encoded reference frame to obtain a sequence of decoded grayscale frames and a decoded reference frame;

determine, for each decoded grayscale frame of the sequence of decoded grayscale frames, a color transfer based on: (i) the color transfer instructions, and (ii) the decoded reference frame; and apply the color transfer to each decoded frame of the sequence of decoded grayscale frames, to obtain a sequence of decoded color frames.

12. The system of claim 11, prior to receiving the encoded frames of the media content item, the control circuitry is further configured to:

detect a change in a luminance parameter between successive frames of the media content item;

based on the detected change, associate a color reference frame with a sequence of color frames, wherein the color reference frame comprises a selected luminance parameter;

de-colorize the color reference frame and the sequence of color frames to produce a grayscale reference frame and a sequence of grayscale frames; and normalize a luminance parameter of each grayscale frame in the sequence of grayscale frames to the selected luminance parameter.

13. The system of claim 12, wherein the control circuitry is further configured to:

encode the color reference frame and the sequence of grayscale frames; and transmit the encoded frames with the color transfer instructions.

14. The system of claim 12, wherein the control circuitry is further configured to de-colorize the color reference frame in an invertible manner.

15. The system of claim 11, wherein the encoded reference frame is an encoded color reference frame, and wherein the control circuitry is further configured to:

decode the encoded color reference frame to obtain a decoded color reference frame, wherein the color transfer instructions comprise a first instruction to:

apply the color transfer of the decoded color reference frame to each frame of the sequence of decoded grayscale frames to obtain the sequence of decoded color frames.

16. The system of claim 15, wherein the control circuitry is further configured to:

store the sequence of encoded grayscale frames in a first buffer, based on the first instruction:

decode the sequence of encoded grayscale frames stored in the first buffer; and apply the color transfer of the decoded color reference frame to each frame of the sequence of decoded grayscale frames stored in the first buffer to obtain the sequence of decoded color frames; and store the sequence of decoded color frames in a second buffer.

17. The system of claim 11, wherein the encoded reference frame is an encoded grayscale reference frame that has been grayscale encoded and that has been generated by way of a de-colorization of a color frame to obtain the encoded grayscale reference frame, and wherein the control circuitry is further configured to:

decode the encoded grayscale reference frame to obtain a decoded grayscale reference frame, the color transfer instructions comprising a second instruction to:

invert the de-colorization to obtain a decoded color reference frame.

18. The system of claim 17, wherein the control circuitry is further configured to:

store the sequence of encoded grayscale frames and the encoded grayscale reference frame in a first buffer, based on the color transfer instructions:

decode the encoded grayscale reference frame and decoding the sequence of encoded grayscale frames stored in the first buffer; and apply the color transfer of the decoded color reference frame to each frame of the sequence of decoded grayscale frames stored in the first buffer to obtain the sequence of decoded color frames; and store the sequence of decoded color frames in a second buffer.

19. The system of claim 11, wherein the control circuitry is further configured to apply the color transfer of the decoded reference frame to the sequence of decoded grayscale frames by:

applying chrominance parameters associated with the decoded reference frame to each frame of the sequence of decoded grayscale frames to obtain the sequence of decoded color frames.

20. The system of claim 11, wherein the input/output circuitry is further configured to receive the encoded reference frame at a higher bitrate than the sequence of encoded grayscale frames.

* * * * *